US012286592B2

(12) United States Patent
Daley et al.

(10) Patent No.: US 12,286,592 B2
(45) Date of Patent: Apr. 29, 2025

(54) PROCESS AND APPARATUS FOR CONVERTING POLYMERS INTO PRODUCTS

(71) Applicant: MURA TECHNOLOGY LIMITED, London (GB)

(72) Inventors: Richard Daley, London (GB); William Rowlands, Alexandria (AU)

(73) Assignee: Mura Technology Limited, London (GB)

( * ) Notice: Subject to any disclaimer, the term of this patent is extended or adjusted under 35 U.S.C. 154(b) by 221 days.

(21) Appl. No.: 17/766,156

(22) PCT Filed: Oct. 2, 2020

(86) PCT No.: PCT/IB2020/059231
§ 371 (c)(1),
(2) Date: Apr. 1, 2022

(87) PCT Pub. No.: WO2021/064647
PCT Pub. Date: Apr. 8, 2021

(65) Prior Publication Data
US 2022/0380682 A1    Dec. 1, 2022

(30) Foreign Application Priority Data

Oct. 4, 2019    (AU) .............................. 2019903756

(51) Int. Cl.
| | |
|---|---|
| *C10G 1/10* | (2006.01) |
| *B01D 3/06* | (2006.01) |
| *B01D 3/14* | (2006.01) |
| *B01D 3/38* | (2006.01) |
| *B01J 3/00* | (2006.01) |

(Continued)

(52) U.S. Cl.
CPC ................. *C10G 1/10* (2013.01); *B01D 3/06* (2013.01); *B01D 3/14* (2013.01); *B01D 3/38* (2013.01); *B01J 3/008* (2013.01); *B01J 19/0013* (2013.01); *B01J 19/002* (2013.01); *B01J 19/006* (2013.01); *B01J 19/2415* (2013.01); *B01J 2219/00094* (2013.01); *B01J 2219/00162* (2013.01); *B01J 2219/00247* (2013.01); *B01J 2219/0027* (2013.01); *B01J 2219/00779* (2013.01);
(Continued)

(58) Field of Classification Search
CPC .............. C10G 1/10; C10G 2300/1003; C10G 2300/807; C10G 2400/06; B01D 3/06; B01D 3/14; B01D 3/38; B01J 3/008; B01J 19/0013; B01J 19/002; B01J 19/006; B01J 19/2415; B01J 2219/00094; B01J 2219/00162; B01J 2219/00247; B01J 2219/0027; B01J 2219/00779; B01J 4/002; B01J 19/24; B01J 2208/00212
USPC ......................................................... 585/241
See application file for complete search history.

(56) References Cited

U.S. PATENT DOCUMENTS 6,107,532 A * 8/2000 Saito ....................... C10G 1/10
44/300

FOREIGN PATENT DOCUMENTS

WO    2018107204 A1    6/2018

OTHER PUBLICATIONS

Meyers, Robert A., "Handbook of Petroleum Refining Processes, Second Edition," McGraw-Hill (1997).

\* cited by examiner

*Primary Examiner* — James C Goloboy
*Assistant Examiner* — Francis C Campanell
(74) *Attorney, Agent, or Firm* — Hoffmann & Baron, LLP

(57) ABSTRACT

The present invention provides methods and an apparatuses for converting polymeric material into hydrocarbon products.

20 Claims, 23 Drawing Sheets

(51) Int. Cl.
*B01J 19/00* (2006.01)
*B01J 19/24* (2006.01)
(52) U.S. Cl.
CPC ................ *C10G 2300/1003* (2013.01); *C10G 2300/807* (2013.01); *C10G 2400/06* (2013.01)

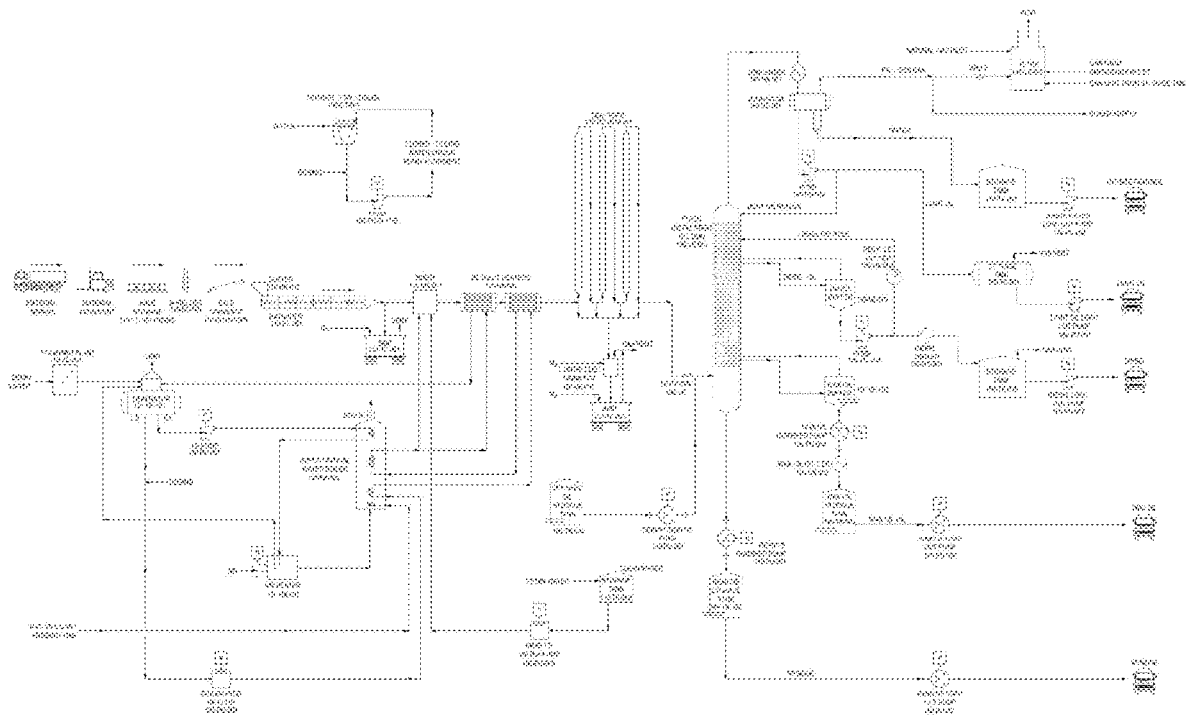
FIGURE ONE

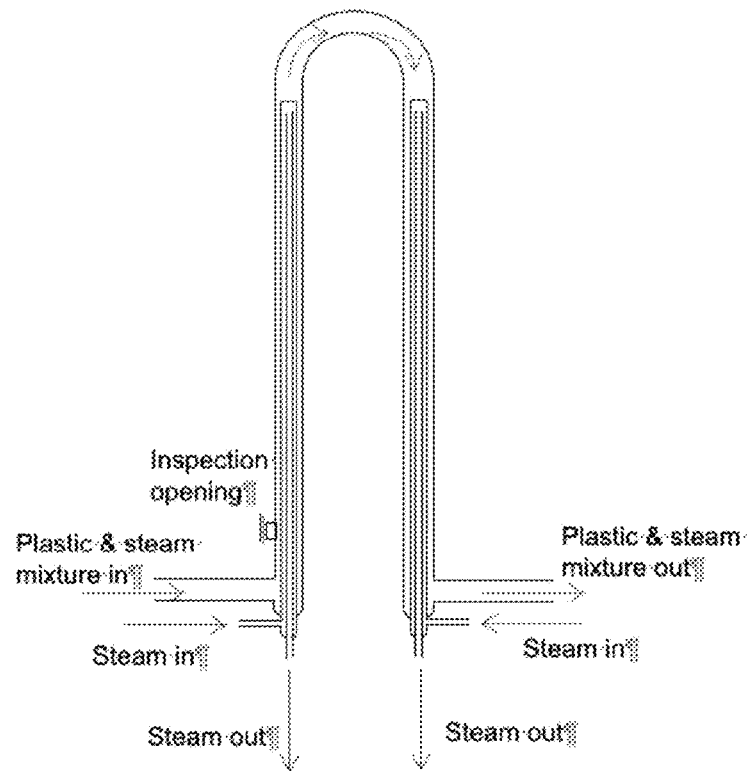
FIGURE TWO
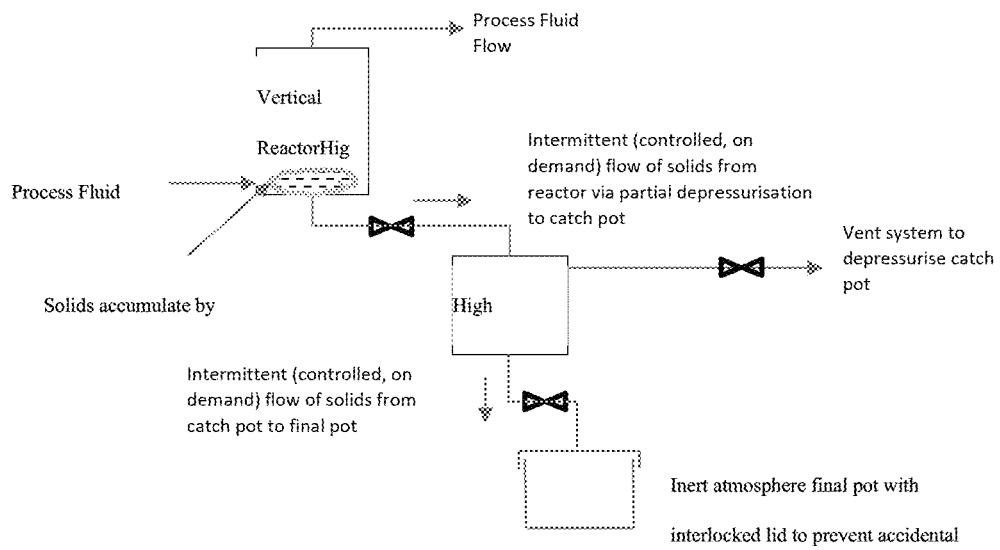
FIGURE THREE

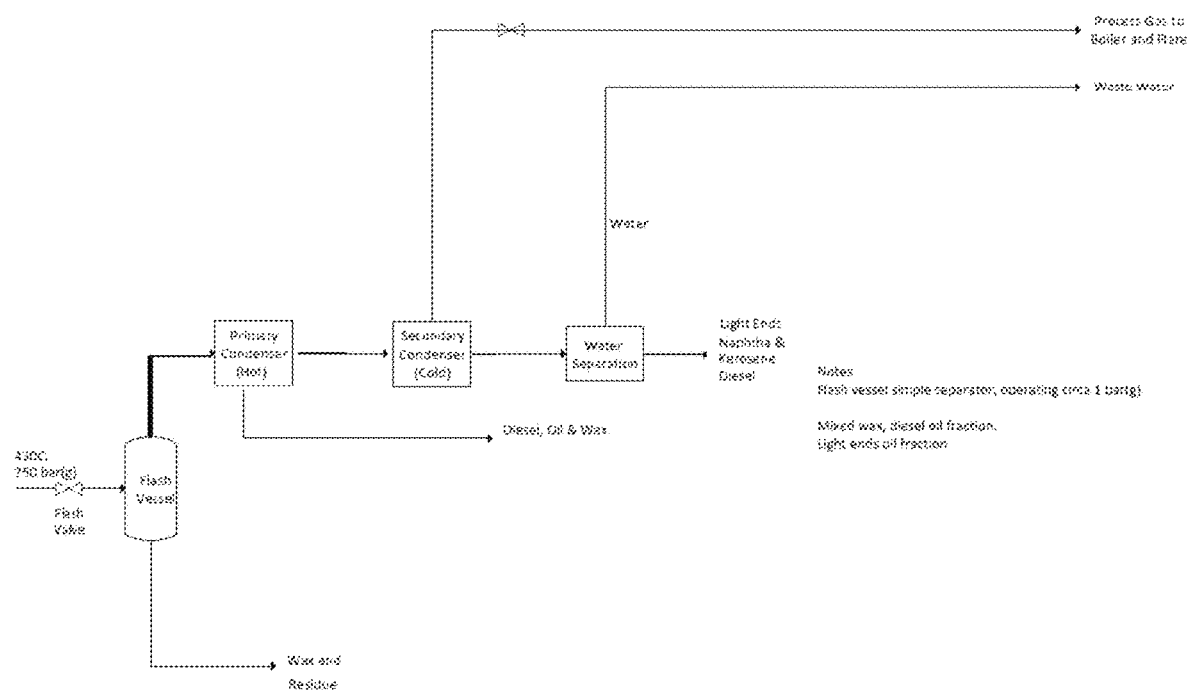
FIGURE FOUR

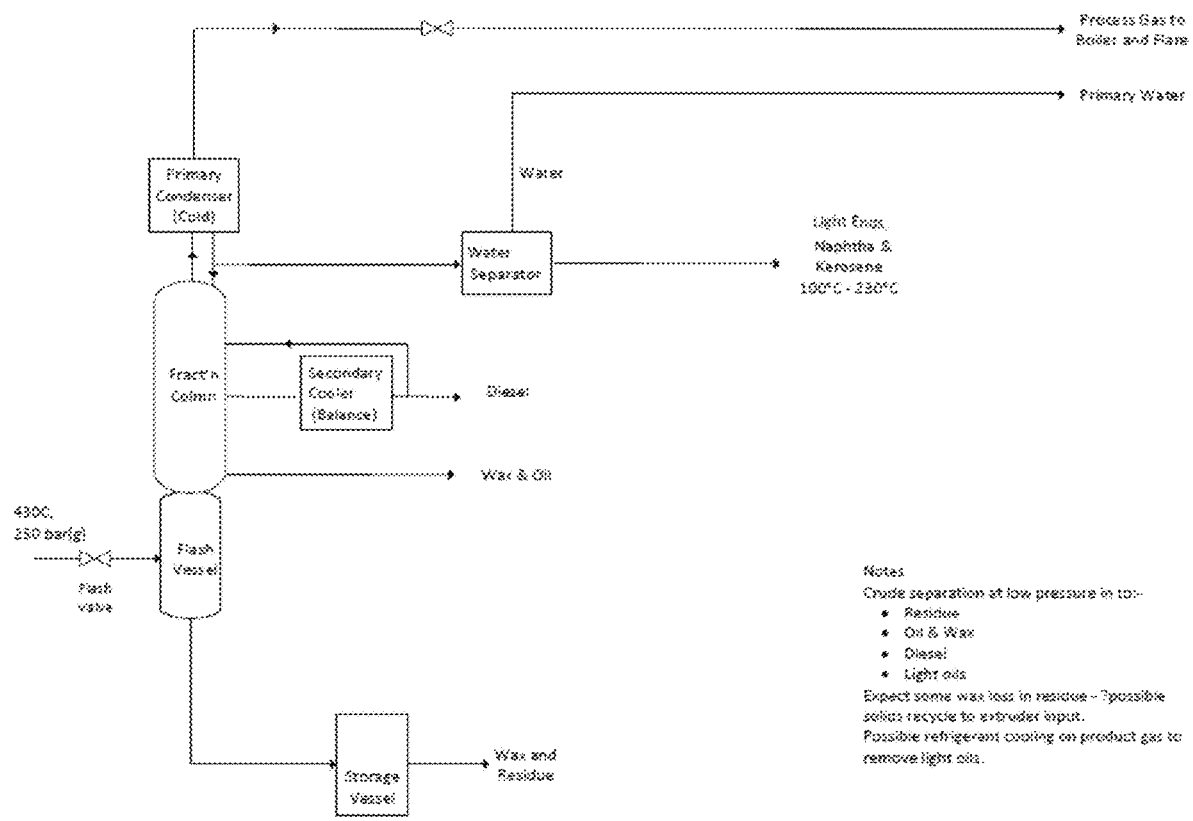
FIGURE FIVE

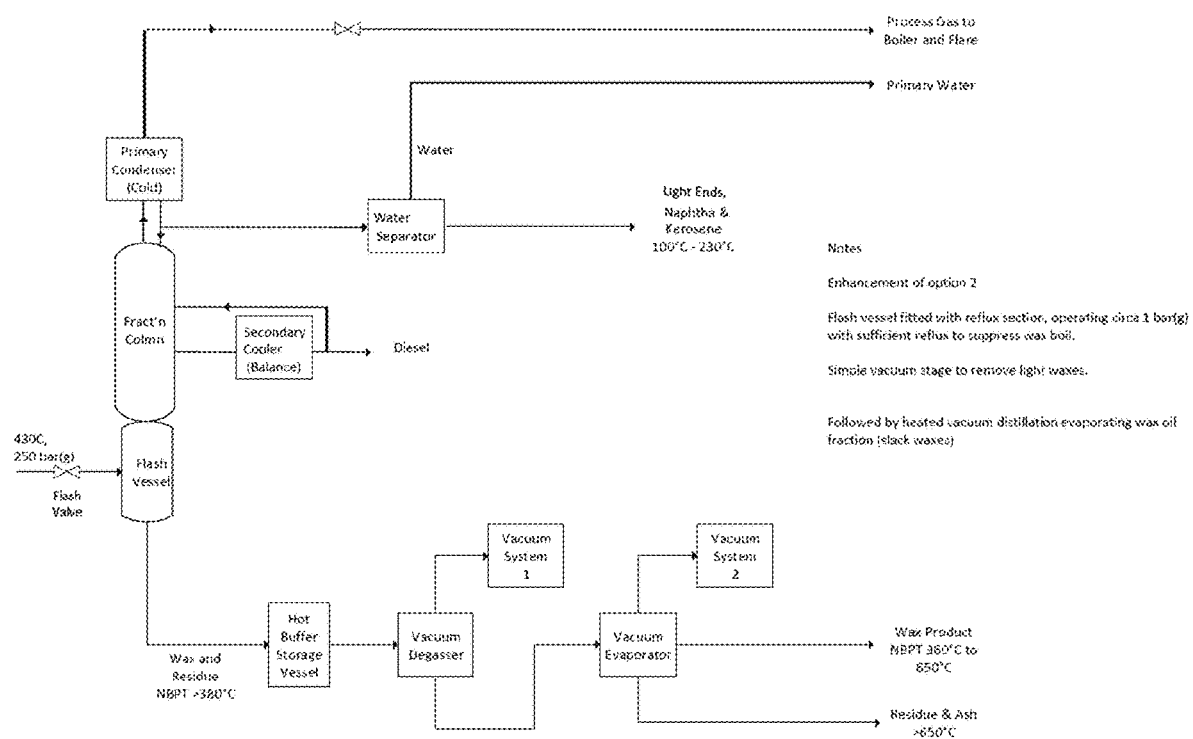
FIGURE SIX

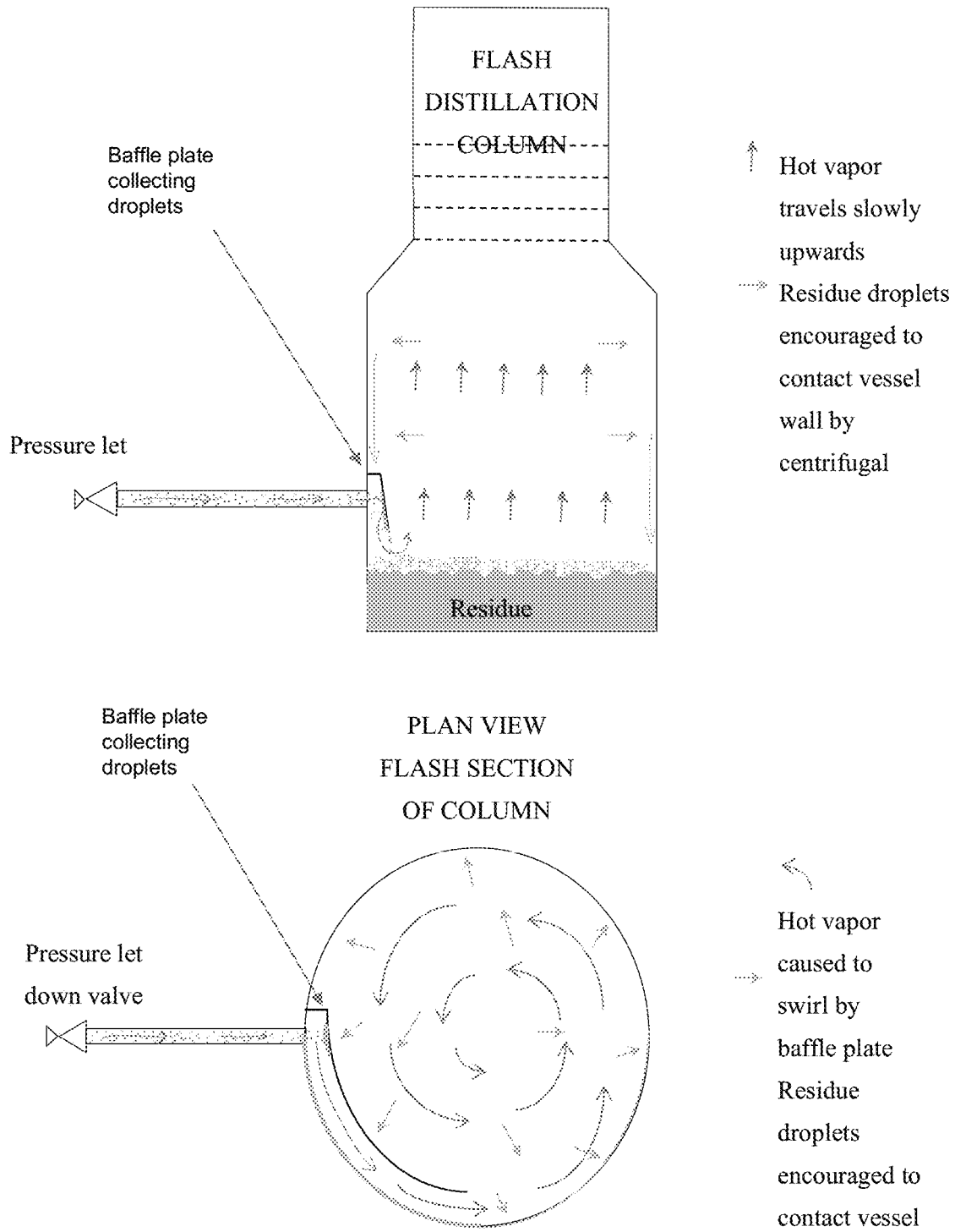
FIGURE SEVEN

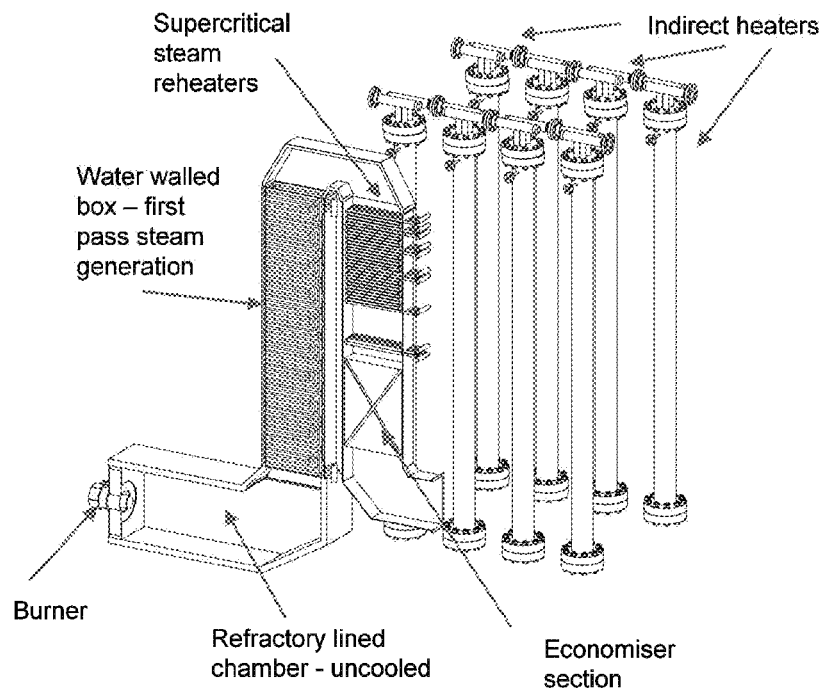
FIGURE EIGHT
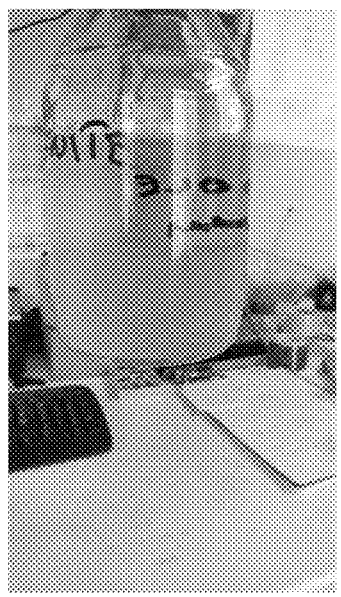
FIGURE NINE

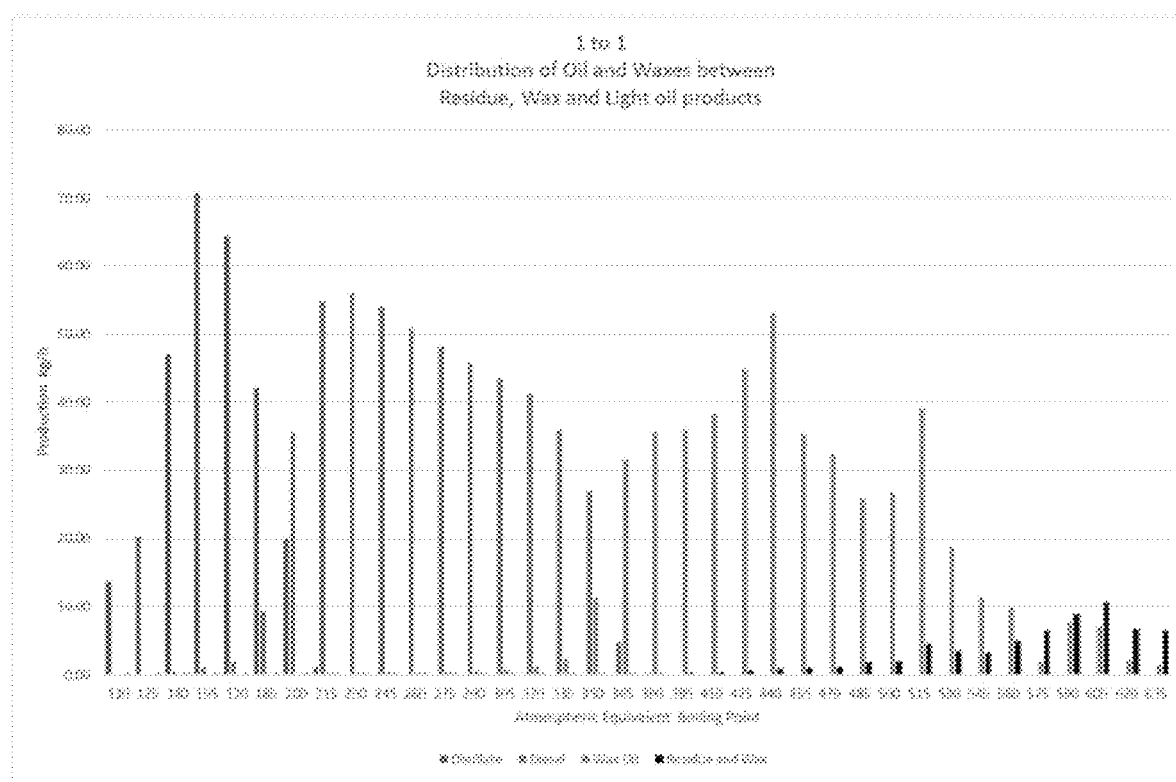
FIGURE TEN

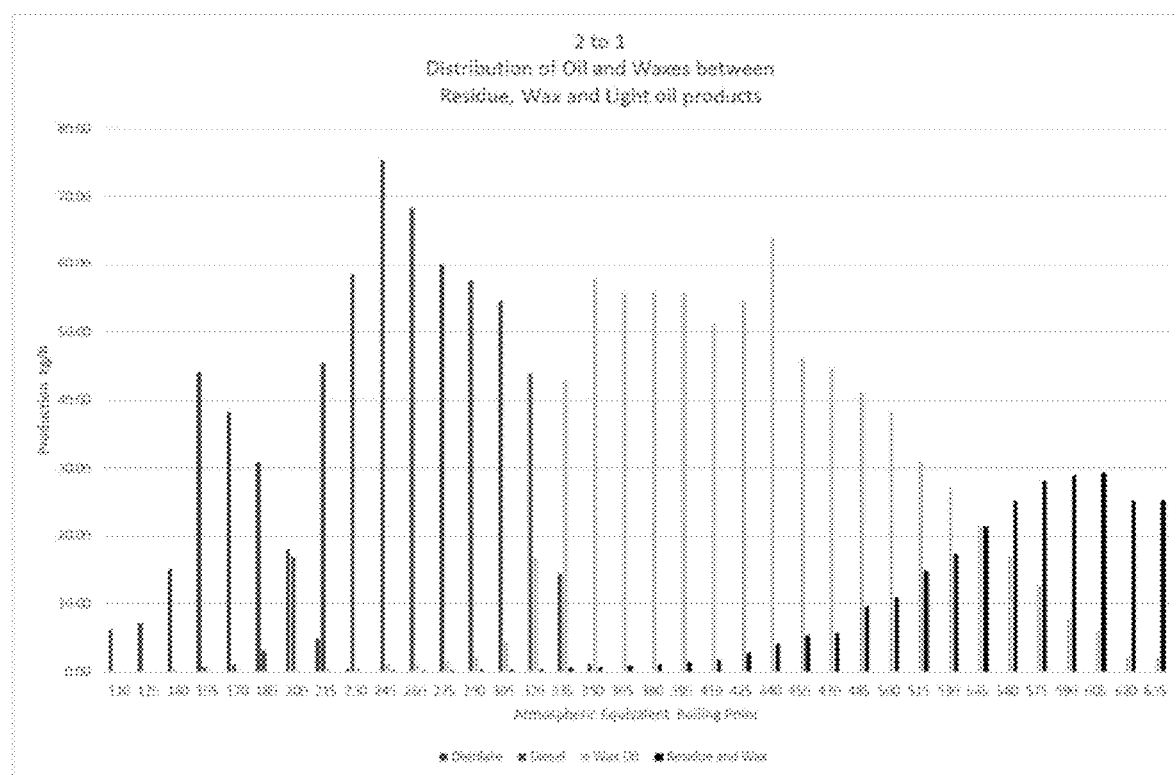
FIGURE ELEVEN

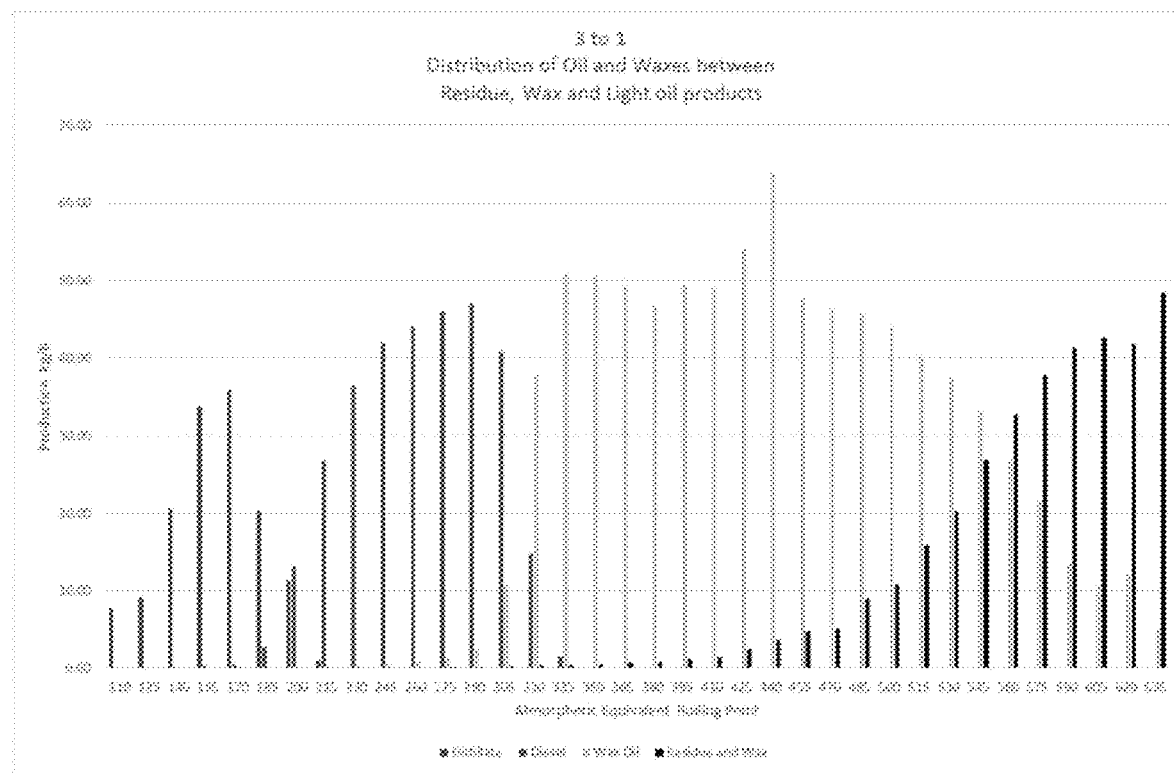
FIGURE TWELVE

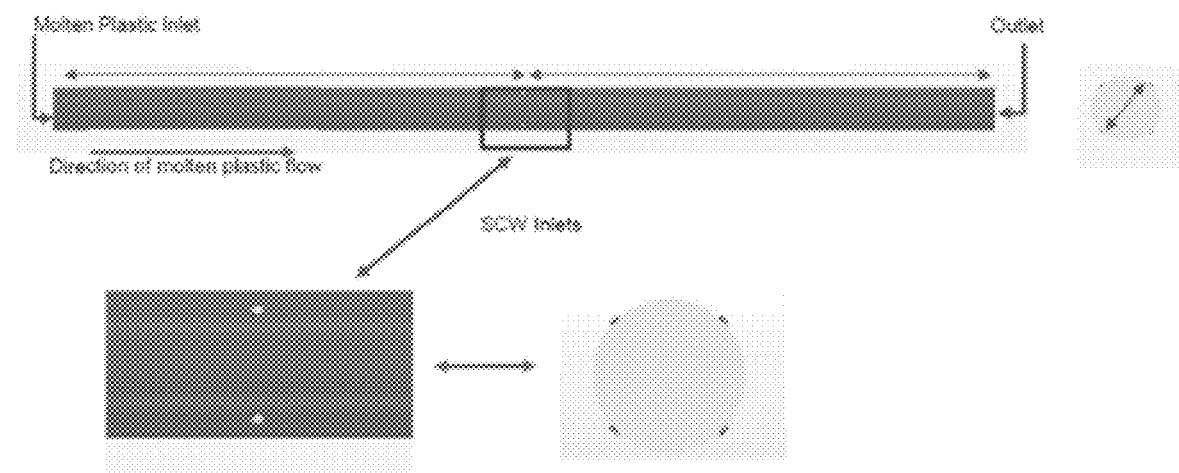
FIGURE THIRTEEN

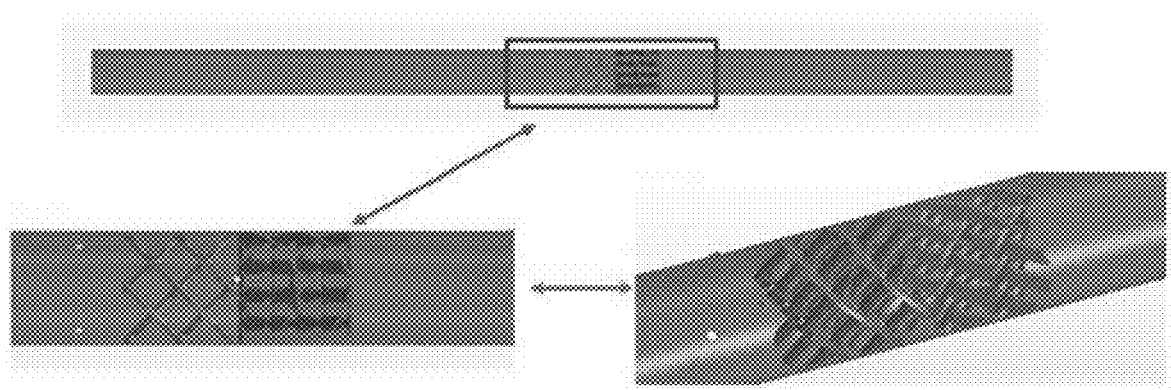
FIGURE FOURTEEN

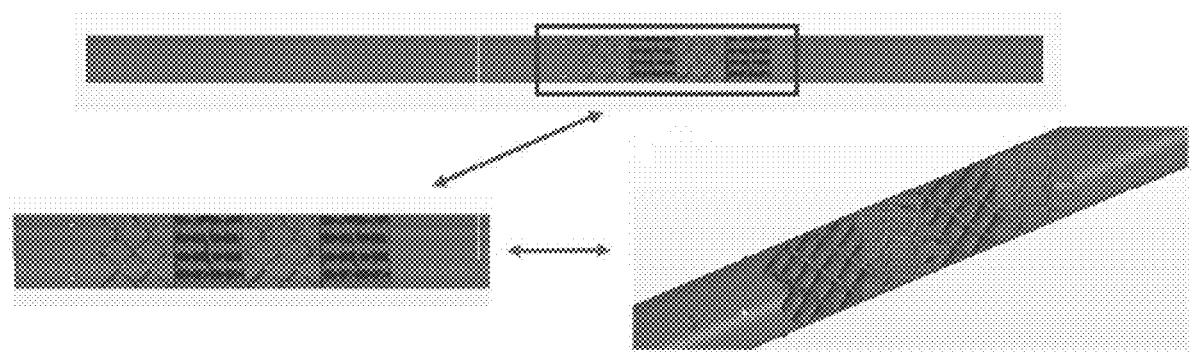
FIGURE FIFTEEN

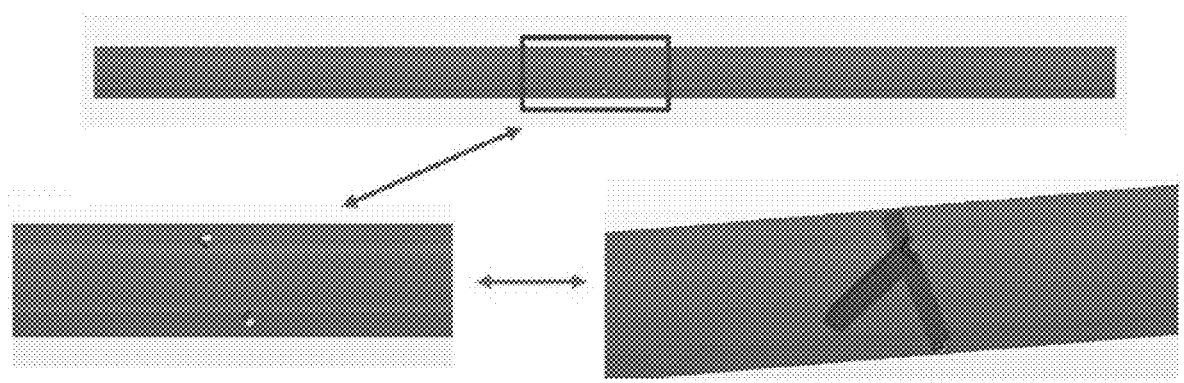
FIGURE SIXTEEN

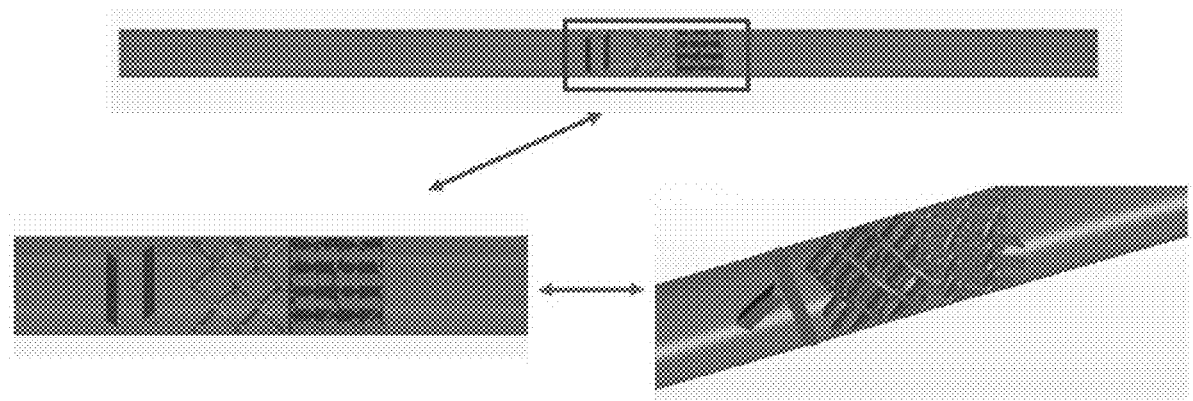
FIGURE SEVENTEEN

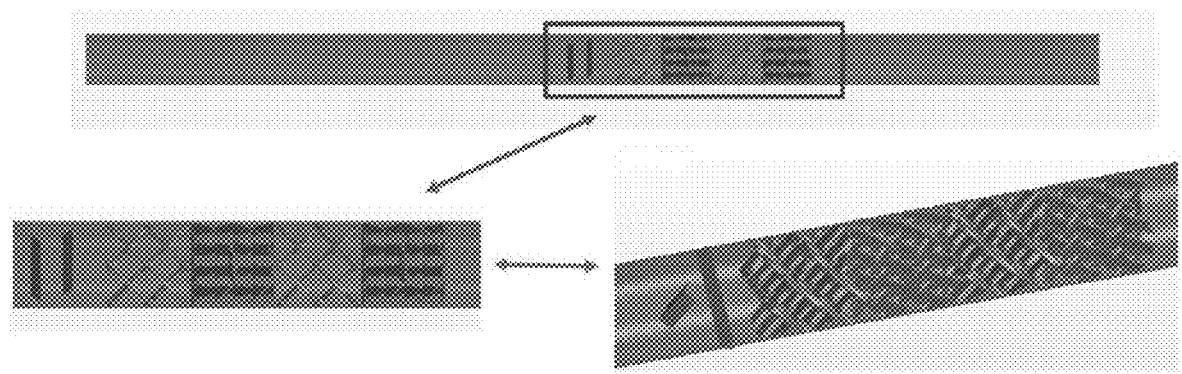
FIGURE EIGHTEEN

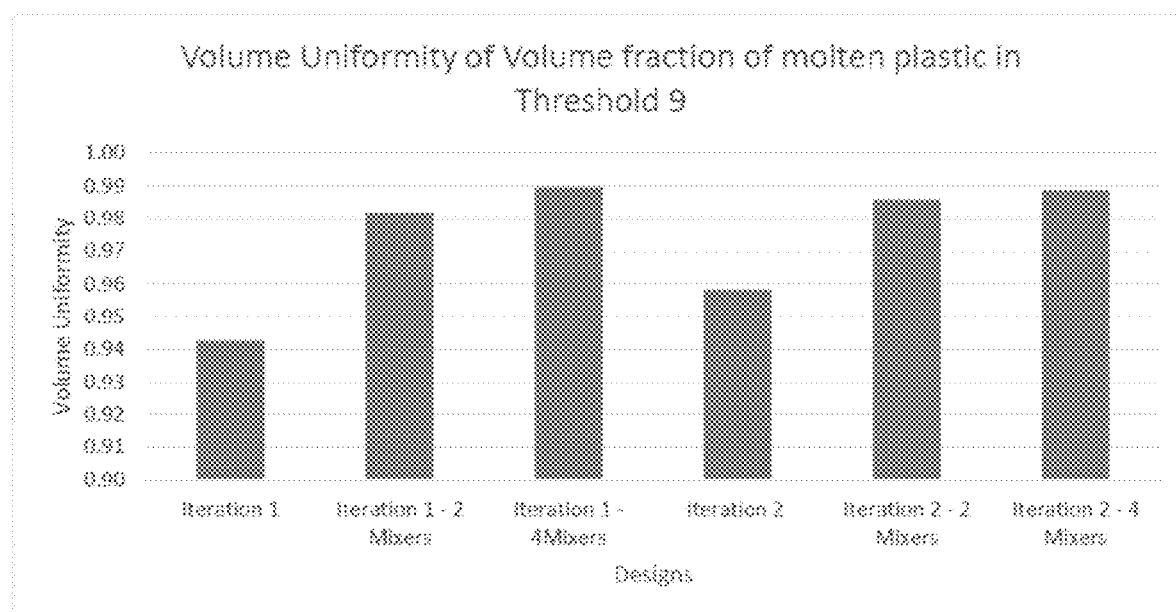
FIGURE NINETEEN

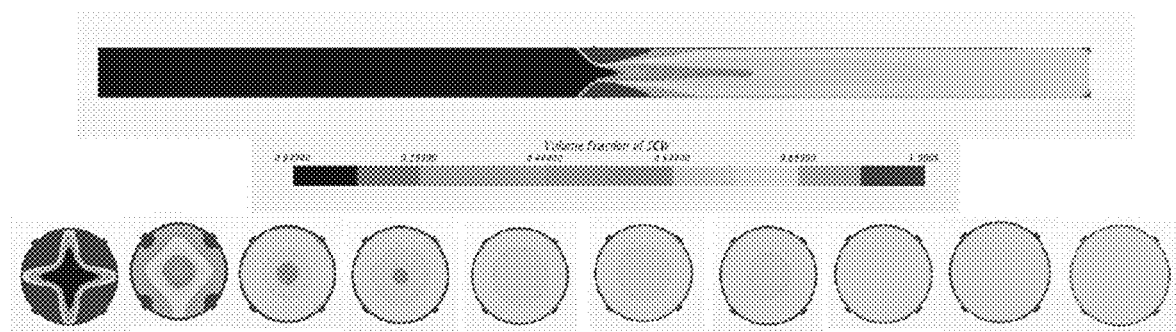
FIGURE TWENTY

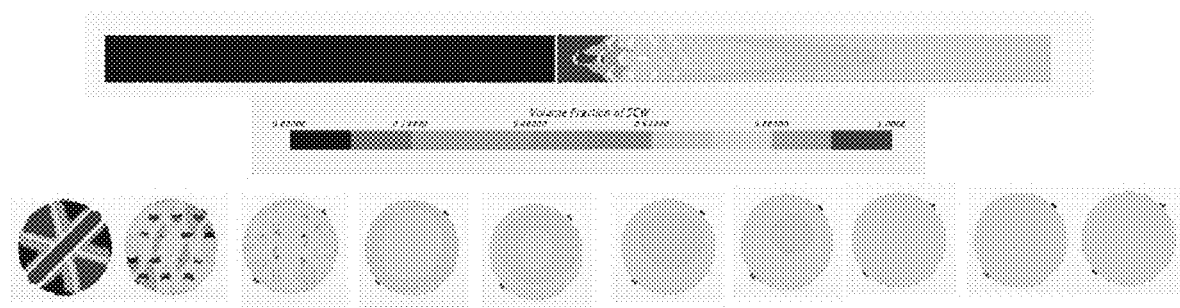
FIGURE TWENTY ONE

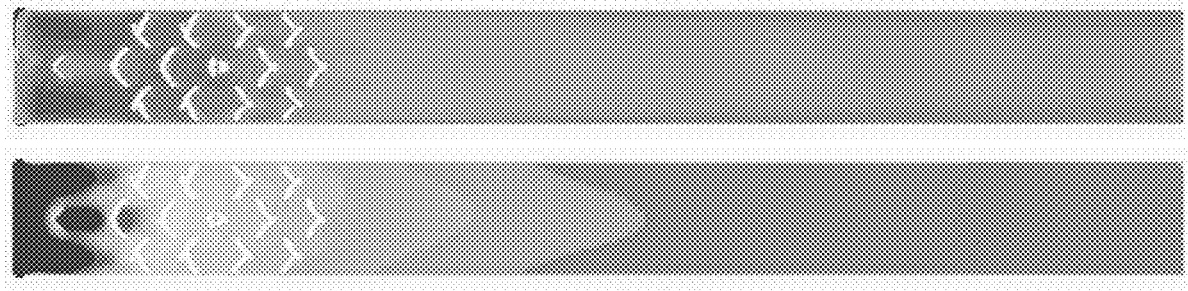
FIGURE TWENTY TWO

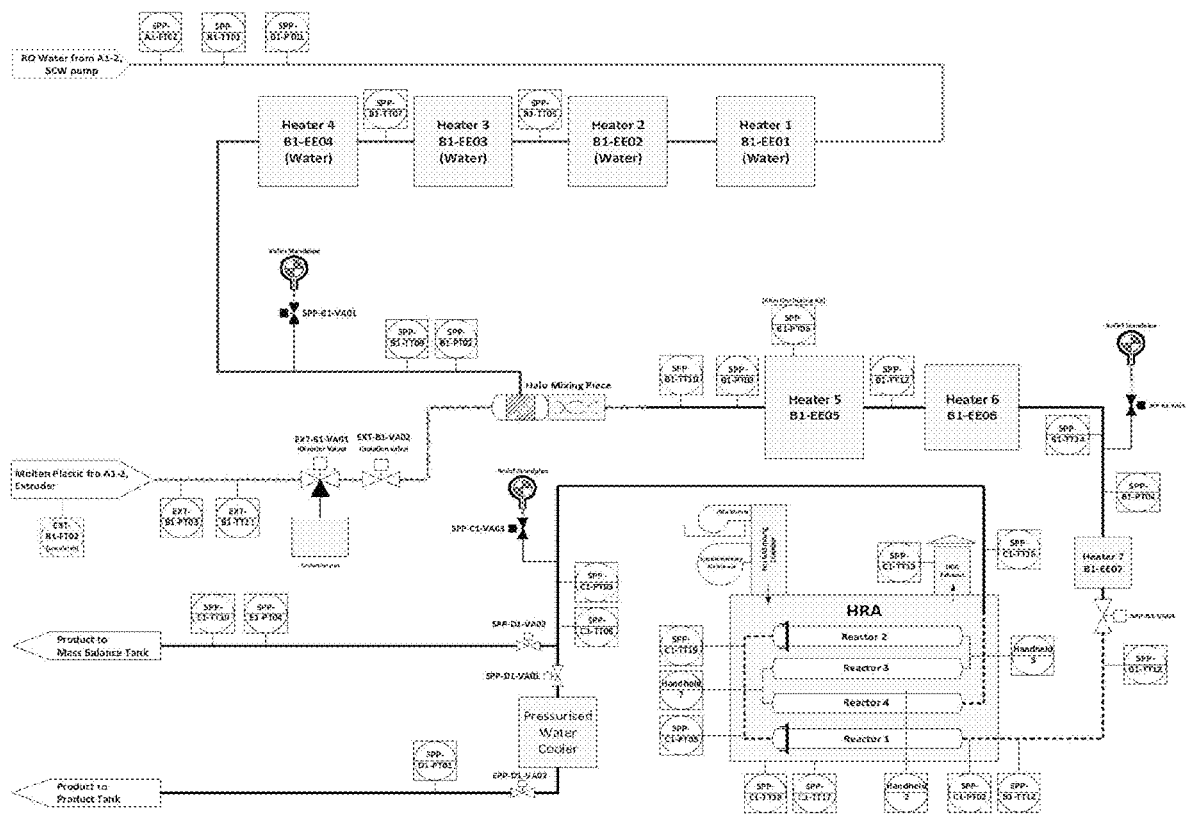
FIGURE TWENTY THREE

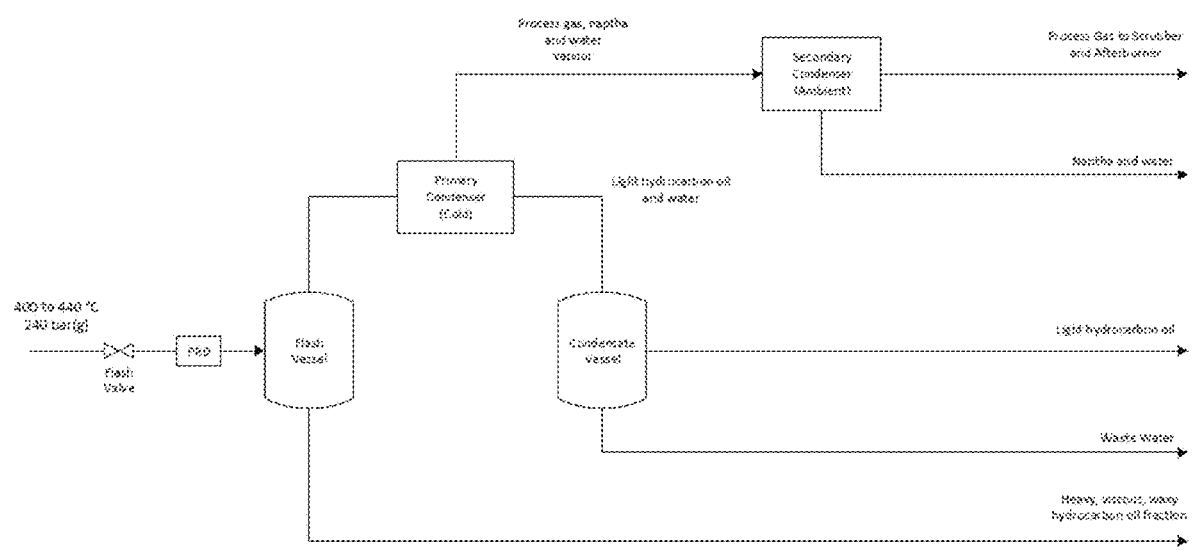
FIGURE TWENTY FOUR

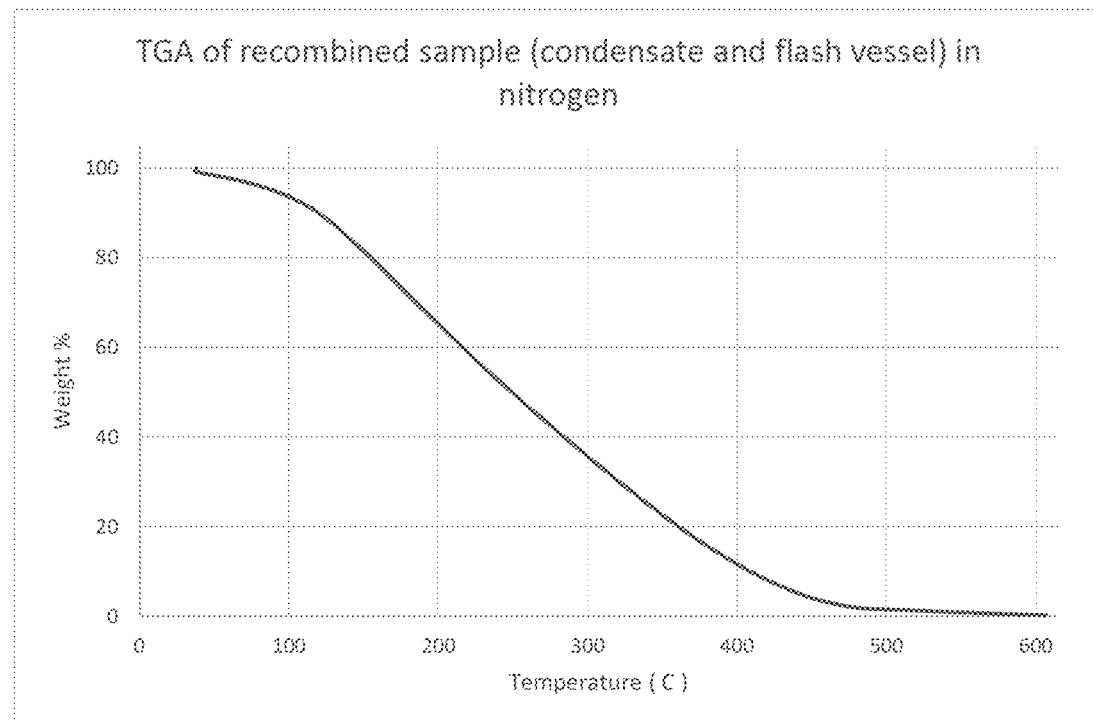
FIGURE TWENTY FIVE
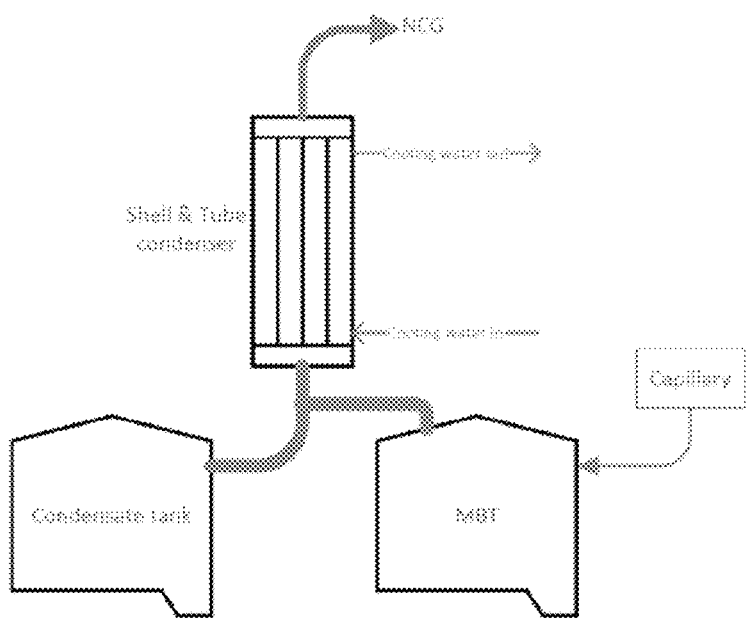
FIGURE TWENTY SIX

PROCESS AND APPARATUS FOR CONVERTING POLYMERS INTO PRODUCTS

INCORPORATION BY CROSS-REFERENCE

The present invention claims priority from Australian provisional patent application number 2019903756 filed on 4 Oct. 2019, the entire content of which is incorporated herein by cross-reference.

TECHNICAL FIELD

The present invention relates generally to the field of waste treatment. More specifically, the present invention relates to methods and apparatuses for converting polymeric materials such as plastics into hydrocarbon products.

BACKGROUND

The current widespread single use of plastic products is unsustainable and is creating a waste plastic problem that is harming the environment. Plastic waste material is poorly biodegradable and represents an increasing environmental problem and hazard to wildlife. The majority of plastic waste is still disposed of in landfill meaning that a significant amount of processed raw material and energy is lost/not utilised.

As crude oil reserves are a finite resource it is important that plastics become more sustainable by avoiding the single use plastics and by increased recycling, avoiding the plastic being simply disposed of to landfill.

There are limits as to the extent to which plastic can be mechanically recycled such that there remains a significant amount of end of life plastic that cannot be mechanically recycled. Indeed, many types of polymer waste are not suitable for recycling.

Presently the main disposal options for this end of life plastic are incineration or land-fill. Many countries discourage landfill because it is unsustainable and potentially polluting. Incineration because of the small amounts of chlorine from e.g. polyvinyl chloride (PVC) content of the polymer waste operates at relatively inefficient conditions and requires extensive flue gas treatment so as not to pollute the environment. While allowing for the recovery of some energy, incineration still results in the loss of valuable hydrocarbon feedstock.

A further option for this end of life plastic is thermo-chemical recycling (e.g. pyrolysis or catalytic pyrolysis or gasification) to produce fuels or chemicals by thermal or catalytic cracking of the polymers. These processes suffer from the problems that they apply heat externally, to the outside of the vessel containing the waste plastic and can therefore suffer from char formation and have hot surfaces that become blocked. Some plastics also decompose producing chemicals that sublime blocking downstream equipment. Heat transfer into polymer masses is also problematic, leading to blockages in plant. Catalytic processes can be sensitive to ash, metals, cellulose (paper), inorganic fillers and additives as impurities in the polymer feed. As a consequence of these problems several waste plastic pyrolysis plants that have attempted to operate commercially have closed down.

A need exists for improved methods and/or devices capable of converting polymeric materials (e.g. plastics) into hydrocarbon feedstock from which new plastic could be manufactured, creating a fully circular economy for plastic.

SUMMARY OF THE INVENTION

The present invention addresses one or more problems existing in the prior art by providing improved means to convert polymeric materials such as waste plastics into valuable hydrocarbon products and/or transport fuels and/or other chemicals.

By practising the methods described herein, valuable chemical constituents of end of life plastic can be chemically recycled making hydrocarbon products that could be reused in various applications including, for example, the production of new plastic. The present invention also offers a solution to the issue of accumulating plastic wastes reducing the consumption of the finite crude oil reserves.

Disclosed herein are methods and apparatuses for treating polymeric material to produce hydrocarbon products.

In some embodiments the polymeric material under treatment may be processed by a suitable extruder which may increase the pressure and therefore the temperature of the polymeric material as it exits the extruder. The polymeric material may be further heated by super-critical water upon exiting the extruder to generate a reaction mixture which may comprise polymeric material, water and optionally other component(s). A mixer may be employed to further mix the reaction mixture and/or a heater may be used to further heat the reaction mixer. The reaction mixture comprising the polymeric material and a solvent (e.g. an aqueous solvent), can be received in a reactor apparatus which houses or includes a reaction zone providing pre-determined reaction temperature/s and/or reaction pressure/s. The reaction mixture may be treated in the reaction zone over a period of time suitable for conversion of all or a portion of the polymeric material present in the reaction mixture into a product, which may exit the reaction zone in the form of a fluid product stream.

In certain embodiments, the fluid product stream exiting the reaction zone at elevated temperature and pressure may be rapidly depressurised in a flash vessel in a manner causing vaporizes a large proportion of the fluid product stream generating a vapour comprising hydrocarbon products, steam, and gases, which may be collected in an accumulation apparatus. The present inventors have advantageously identified that fractionation of the vapour into individual components including gas can be enhanced by way of the aforementioned the rapid reduction in fluid product stream pressure and utilising energy of the vapour.

Gas from the vapour may be utilised as energy in the methods of the present invention. For example, the gas may be transferred to an apparatus such as a boiler for generating energy to for heating the super-critical water. The energy of the gas may be used for any process of the method.

As described in more detail below, the means by which the present invention addresses one or more of the shortfalls in the prior art noted above include, without limitation, any one or more of the following features.

Polymeric materials such as waste plastics may be readily prepared by means known in the art for extrusion by a suitable extruder. Polymeric material extrudate exiting the extruder at elevated pressure may be combined with a heated/pressurised aqueous solvent (super-heated water) to provide a mixture with a high concentration of the polymeric material, when compared to an equivalent reaction mixture formed without extruding the polymeric material. The super-heated water phase may provide efficient heat transfer to the polymer melt by virtue of its high diffusivity, and/or the presence of the water may supress char formation. Halogens (e.g. chlorine) present in the reaction mixture may be largely transferred to the aqueous phase as inorganic halides thereby reducing issues around dioxin formation. Cellulose based impurities such as paper may be largely gasified or else converted to oil components. Ash-like components and inorganic fillers may be largely carried through the process and can be separated from the products by means known in the art (e.g. fractional distillation). The design of the extruder-reactor interface and/or the mixing interface for the dilution with supercritical or superheated aqueous solvent (e.g. water) may, for example, be at least in part responsible for providing advantage/s over prior art methods.

One or more collection apparatus/es according to the present invention may be provided in various configurations. Where substantial energy has been introduced in steps of the method, the energy of the vapour may be used to fractionate the vapour into constituents. For example, a vertical vessel may include various containers in a vertical arrangement which receive constituents as their energy propels them to various heights within the vessel so that they land in a particular container. The container may be associated with a collection pipe to direct the constituents to their respective reservoirs for further processing. Water may be a constituent and collected for cleaning. Gas may be at least one constituent of a fractionated vapour which is utilised as energy in the method.

Depending upon the energy stored in various constituents of the vapour, the constituents may self-separate to be separately captured. Providing the constituents with the opportunity to self-separate avoids the necessity of additional separation steps which can require re-heating the products, requiring additional energy and time to be expended. The self-separation of constituents of fractionated vapour may be for example, hard wax residue.

The methods and apparatus described herein may be used to process so-called "end-of-life plastics" which have been manufactured with impurities to exhibit various characteristics. The impurities might, for example, might make a plastic opaque and coloured. These impurities might be for example, $TiO_2$, $CaCO_3$, $ZnO$ and/or $NaCl$. The heaviness of impurities may cause them to gravitate to the bottom one or more reactor vessels where they may collected. Later, one of various containers of the collection apparatus may include a product useful as bitumen. The methods and apparatus may include means for adding the impurities to one or more bitumen products for safe disposal. As mentioned above, the water constituent of the fractionated vapour may be cleaned wherein impurities may be collected and added to a product useful as bitumen for safe disposal. The bitumen for example, may be used in construction of roads.

As described herein treating the reaction mixture in a reactor apparatus at various reaction temperatures and a reaction pressures over various periods of time suitable for conversion of all or a portion of the polymeric material present in the reaction mixture into a fluid product stream may determine the ultimate end products of the fractionated vapour. Depending upon the available feedstock and the desired product output, various parameters may be adjusted.

The methods of the present invention may include substantially harsh conditions due to high pressure and high temperatures. Therefore, appropriate selection of vessel and piping steel is beneficial. Depending upon the steel selected, the reaction mixture may interact with the steel wherein the steel may act as a catalyst causing various end products to take on characteristics. Depending upon the desired end products additional surfaces may be added to, for example, vessel/s of the reactor apparatus. One such surface may include nickel for example, which may drive certain target reactions to take place.

The present invention relates at least in part to the following embodiments:

Embodiment 1. A method for treating polymeric material to produce hydrocarbon products, the method comprising:
  generating a reaction mixture comprising the polymeric material and an aqueous solvent,
  treating the reaction mixture in a reactor apparatus at a reaction temperature and a reaction pressure over a period of time suitable for conversion of all or a portion of the polymeric material present in the reaction mixture into a fluid product stream, and
  depressurising the fluid product stream, wherein:
    the fluid product stream is at a temperature of at least 350° C. and a pressure of at least 180 bar immediately prior to the depressurising,
    the depressurising comprises reducing the pressure of the fluid product stream to less than 25 bar in a flash vessel thereby vaporizing at least a portion of the fluid product stream and generating a vapour comprising constituent parts of hydrocarbon products, steam, and gas, and
    the vaporizing provides energy to facilitate fractionation of the vapour into the constituent parts; and
  collecting the fractionated vapour.

Embodiment 2. The method according to embodiment 1, wherein the fluid product stream is at a temperature of at least: 380° C., 400° C., 420° C., 450° C., or 470° C., immediately prior to the depressurising.

Embodiment 3. The method according to embodiment 1 or embodiment 2, wherein the fluid product stream is at a pressure of at least: 200 bar, 220 bar, 240 bar, 260 bar, 280 bar or 300 bar, immediately prior to the depressurising.

Embodiment 4. The method of any one of embodiments 1 to 3, wherein the flash vessel is coupled directly with the accumulation apparatus, is an integral part of the accumulation apparatus, or is directly coupled to one or more staged product condensers.

Embodiment 5. The method according to any one of embodiments 1 to 4, comprising fractionating and condensing the vapour into fractions having a maximum atmospheric equivalent boiling point of less than: 400° C., 450° C., 500° C., 550° C. or 600° C. and collecting a residual fraction with a minimum atmospheric equivalent boiling point of more than 400° C., 450° C., 500° C., 550° C. or 600° C.

Embodiment 6. The method according to any one of embodiments 1 to 5, wherein solid fillers and/or inorganic matter and/or metal salts from the depressurized product stream are retained within residue matrix produced by said vaporizing and fractionation.

Embodiment 7. The method of any one of embodiments 1 to 6, wherein the depressurising and fractionation enables separation of the aqueous solvent from the hydrocarbon products including separation of the aqueous solvent from low boiling hydrocarbons at a temperature below: 10° C., 20° C., 30° C., 40° C., 50° C., or 60° C.

Embodiment 8. The method according to embodiment 7, wherein the separation of the aqueous solvent from low boiling hydrocarbons is conducted under an effective gravity of 9.8_+/−0.1 m/s$^2$.

Embodiment 9. The method according to embodiment 7 or embodiment 8, wherein the separated aqueous solvent comprises a total organic carbon content (TOC) of less than: 15,000 mg/l, 10,000 mg/l, 5000 mg/l, 2500 mg/l, 1000 mg/l, or 500 mg/l.

Embodiment 10. The method of embodiments 1 to 9 further comprising injecting steam into the flash vessel and contacting the fluid product stream with the steam.

Embodiment 11. The method of any one of embodiments 1 to 10, wherein said generating of the reaction mixture comprises:
providing a molten stream of the polymeric material;
injecting the aqueous solvent into the molten stream of polymeric material; and
mechanical mixing of the aqueous solvent and the molten stream of polymeric material.

Embodiment 12. The method of embodiment 11, wherein the aqueous solvent is supercritical prior to said injecting.

Embodiment 13. The method of embodiment 11 or embodiment 12, wherein the aqueous solvent is water or substantially water.

Embodiment 14. The method of any one of embodiments 11 to 13, wherein the mechanical mixing comprises use of solvent distribution grids in an assembly comprising one or more static mechanical mixing devices.

Embodiment 15. The method of embodiment 12, wherein fluid flow discharged by any said mechanical mixing device has a volume uniformity of greater than about: 94%, 95%, 96%, 97%, or 98%.

Embodiment 16. The method of any one of embodiments 11 to 15, wherein the aqueous solvent is injected into the molten stream of polymeric material through a series of nozzles spanning the circumference of the any said mixing device and solvent distribution grid.

Embodiment 17. The method of embodiments 14 to 16, wherein during said generating of the reaction mixture there is a pressure drop across the mixing device of less than: 2 bar, 5 bar, 10 bar, 20 bar, or 30 bar.

Embodiment 18. The method of any one of embodiments 12 to 17, wherein the supercritical aqueous solvent is generated in a boiler apparatus comprising a burner fuelled by gas released from the fluid product stream.

Embodiment 19. The method of embodiment 18, wherein the supercritical aqueous solvent is generated in a boiler apparatus comprising a burner fuelled by natural gas.

Embodiment 20. The method of embodiment 18 or embodiment 19, wherein the supercritical aqueous solvent exits the boiler apparatus at a temperature of at least: 450° C., 500° C., or 550° C.

Embodiment 21. The method of any one of embodiments 18 to 20, wherein the boiler operates at a pressure of at least: least 180 bar or at least 200 bar or at least 220 bar or at least 240 bar or at least 250 bar, at least 270 bar, or 290 bar, or 310 bar or 330 bar during generation of the supercritical aqueous solvent.

Embodiment 22. The method of any one of embodiments 18 to 21, comprising heating the gas released from the fluid product stream in the boiler apparatus to a temperature of at least 850° C. for at least 2 seconds to thereby destroy halogenated organic compounds including any one or more of: chlorinated dioxins, chlorinated furans, chlorinated biphenyls and other dioxin-like compounds of environmental concern.

Embodiment 23. The method of any one of embodiments 1 to 22, wherein said treating comprises contacting the reaction mixture with supplementary metal catalysts in addition to those present in any metal surface in contact with the reaction mixture during said generating or treating, wherein the supplementary metal catalysts are:
components of a solid material that is mixed into the reaction mixture to facilitate contact between the fluids and the supplementary metal catalyst, and/or
a component of any said mixing device.

Embodiment 24. The method according to embodiment 23, wherein the supplementary metal catalysts are solid state transition metal catalysts.

Embodiment 25. The method according to embodiment 23 or embodiment 24, wherein the supplementary metal catalysts are solid state transition metal catalysts, and wherein the oxidation state of the transition metal is initially a formal zero valent oxidation state.

Embodiment 26. The method according to embodiment 25, wherein the zero valent metal is selected from any of: zero valent iron and nickel.

Embodiment 27. The method of embodiments 23 to 26, where the supplementary metal catalysts catalyse the transfer of hydrogen atoms from the aqueous solvent to the hydrocarbon products arising from said treating of the polymeric material.

Embodiment 28. The method according to any one of embodiments 1 to 27, further comprising removal of solid materials from the reaction mixture during said treating, wherein the solid materials:
are inorganic materials present within the polymeric material,
have a greater density than fluids within the reaction mixture and separate from the reaction mixture by gravity during said treating; and
are removed a reactor apparatus in which said treating is conducted by blowing down into a receiver vessel during said treating by means of remotely operated valves.

Embodiment 29. The method according to embodiment 28, wherein the inorganic materials:
are fillers or contaminants present within the polymeric material prior to conducting the method; and/or
have reacted with the aqueous solvent and/or with carbon rich materials formed in small volumes by side reactions during said treating.

Embodiment 30. The method according to embodiment 28 or embodiment 29, wherein the solid materials are blown down into the receiver vessel with a portion of the hydrocarbon products, waxes, polymer oligomers or partly depolymerized materials.

Embodiment 31. The method according to any one of embodiments 1 to 30, wherein the method is conducted in a reactor apparatus comprising any one or more of:
systems for testing pressure levels in valving and a pressure letdown vessel within said reactor apparatus,
a system allowing cooling of material blown down into a receiver vessel of the reactor apparatus,
a final collection pot with removable lid for blown down material that is interlocked with its lid and with interconnected pipes and valves to prevent accidental removal of the pot and contents.
venting for release of gases formed during or after said treating,
providing inert atmospheres comprising nitrogen, argon, carbon dioxide and/or other inert gases preventing ignition and combustion of materials contained within the letdown pot and collection pot, sequencing systems to minimise mechanical shock in the reactor apparatus.

Embodiment 32. The method of any one of embodiments 1 to 31, wherein:
one or more heat exchanger/s or a is/are used to indirectly heat the reaction mixture to the reaction temperature;
the one or more heat exchanger/s does not comprise an expansion bellow arrangement; and
the one or more heat exchanger/s comprise a double heated probe type arrangement comprising a steam pipe within a steam pipe and/or an electric powered heater element used to indirectly heat the steam and/or reaction mixture.

Embodiment 33. The method according to embodiment 10, comprising utilising a fired superheater to heat the steam prior to injecting the steam into the flash vessel.

Embodiment 34. The method according to any one of embodiments 1 to 33, wherein the reaction temperature is at least: 380° C., 400° C., 450° C., or 500° C.

Embodiment 35. The method of any one of embodiments 1 to 34, wherein the hydrocarbon product comprises a naphtha component boiling between 10° C. and 210° C. AEBP, and wherein the naphtha component comprises:
more than 10%, 20% 30%, 40% by mass olefins; and/or
more than 10%, 20%, 30% 40% by mass n-paraffins; and/or
more than 10%, 20%, 30% 40% by mass cycloalkanes or cycloalkenes; and/or
more than 10%, 20%, 30% 40% by mass aromatics.

Embodiment 36. The method of any one of embodiments 1 to 35, wherein the hydrocarbon product comprises a gas oil component boiling between 210° C. and 360° C. AEBP, and wherein the gas oil component comprises:
more than 10%, 20% 30%, 40% by mass olefins; and/or
more than 10%, 20%, 30% 40% by mass n-paraffins; and/or
more than 10%, 20%, 30% 40% by mass cycloalkanes or cycloalkenes; and/or
more than 10%, 20%, 30% 40% by mass aromatics.

Embodiment 37. The method of any one of embodiments 1 to 36, wherein the hydrocarbon product comprises a heavy gas oil component boiling between 360° C. and 550° C. AEBP, and the heavy gas oil component comprises:
more than 10%, 20% 30%, 40% by mass olefins; and/or
more than 10%, 20%, 30% 40% by mass n-paraffins; and/or
more than 10%, 20%, 30% 40% by mass cycloalkanes or cycloalkenes; and/or
more than 10%, 20%, 30% 40% by mass aromatics.

Embodiment 38. The method according to any one of embodiments 1 to 37, wherein:
the polymeric material used to generate said reaction mixture is a molten polymeric material extrudate;
the polymeric material extrudate is diverted to a collection vessel prior to generating said reaction mixture;
the collection vessel is provided with an inert atmosphere avoiding combustion of the molten polymeric material extrudate; and
the collection vessel is connected to a reactor apparatus by one or more lines providing double valve isolation on each line to prevent reverse flow of the molten polymeric material extrudate from the reactor.

Embodiment 39. The method according to embodiment 14 or embodiment 15, wherein a system of temperature measurements provides warning of flow back from the mixing device/s towards an extruder apparatus in connection with the mixing device/s, allowing operation of isolation valves thus preventing reverse flow from the mixing device/s.

Embodiment 40. The method according to any one of embodiments 1 to 39, wherein the reactor apparatus is a continuous flow reactor apparatus.

Embodiment 41. The method according to any one of embodiments 1 to 40, wherein the treating is performed under conditions of continuous flow.

Embodiment 42. The method according to any one of embodiments 1 to 41, wherein the polymeric material does not comprise any one or more of: lignocellulosic matter; naturally-occurring carbohydrate polymers; lignin; cellulose; hemicellulose; combinations of any two of lignin, cellulose, hemicellulose; lignite (brown coal); subbituminous coal; any combination thereof.

Embodiment 43. A continuous flow reactor apparatus for treating polymeric material, comprising:
an extruder for producing an extrudate comprising a molten stream of the polymeric material;
a boiler apparatus for preparing and adding supercritical water to the extrudate;
a mechanical mixing device configured for mixing of the extrudate with the supercritical water to thereby form a reaction mixture;
a reaction zone in communication with the mechanical mixing device and with indirect heaters, wherein the reaction zone is for treating the reaction mixture at a defined temperature and pressure for a defined residence time to thereby produce a fluid product stream;
a pressure let down device for depressurisation of the fluid product stream, wherein the pressure let down device is in communication with the reaction zone and a flash vessel;
a fractionation apparatus for separation of vapour generated in the flash vessel.

Embodiment 44. The continuous flow reactor apparatus of embodiment 43, wherein the indirect heaters are not circumferential.

Embodiment 45. The continuous flow reactor apparatus of embodiment 43 or embodiment 44, wherein the flash vessel:
is coupled directly with the fractionation apparatus; or
is an integral part of the flash column; or
and the fractionation apparatus are separate product condensers.

Embodiment 46. The continuous flow reactor apparatus of any one of embodiments 43 to 45, wherein the mechanical mixing device is a static mechanical mixing device.

Embodiment 47. The continuous flow reactor apparatus of any one of embodiments 43 to 46, comprising a series of nozzles spanning the circumference of the mechanical mixing device or a portion of thereof, for injection and distribution of the supercritical water into the molten stream of polymeric material.

Embodiment 48. The continuous flow reactor apparatus of any one of claims 43 to 47, wherein the boiler apparatus comprises a burner in communication with the fractionation apparatus (e.g. a vessel in the fractionation apparatus) for receiving gas.

Embodiment 49. The continuous flow reactor apparatus of any one of embodiments 43 to 48, wherein the boiler apparatus comprises a burner in communication with a source of natural gas.

Embodiment 50. The continuous flow reactor apparatus of any one of embodiments 43 to 49, wherein one or more components of the reaction zone comprises a source of metal catalysts for the reaction mixture.

Embodiment 51. The continuous flow reactor apparatus of embodiment 50, wherein the metal catalysts are solid state transition metal catalysts.

Embodiment 52. The continuous flow reactor apparatus of any one of embodiments 43 to 51, wherein:
 a collection vessel configured to collect the molten polymeric material extrudate prior to generating said reaction mixture is connected to the reactor apparatus by one or more lines;
 the one or more lines provide double valve isolation on each line and prevent reverse flow from the reactor;
 the collection vessel is provided with an inert atmosphere for avoiding combustion of the extrudate.

Embodiment 53. The continuous flow reactor apparatus of any one of embodiments 43 to 52, comprising a blow down component for removal of solid materials from the reaction mixture, and a receiver vessel for the solid materials.

Embodiment 54. The continuous flow reactor apparatus of any one of embodiments 43 to 53, comprising means for separating solid residues and/or bottoms formed during pretreatment of the polymeric material and/or the treating of the reaction mixture, and means for combining the solid residues and/or bottoms with the fluid product stream in the flash vessel to thereby vaporize volatile components of the solid residues and/or bottoms.

Embodiment 55. The continuous flow reactor apparatus of any one of embodiments 43 to 54, comprising:
 a heat exchanger for indirectly heating the reaction mixture to the defined temperature at multiple points along a vessel in the reactor apparatus housing the reaction zone through which the reaction mixture flows;
means for providing supercritical steam generated by a supercritical steam generator to the heat exchanger.

Definitions

As used in this application, the singular form "a", "an" and "the" include plural references unless the context clearly dictates otherwise. For example, the term "catalyst" also includes a plurality of catalysts.

As used herein, the term "comprising" means "including." Variations of the word "comprising", such as "comprise" and "comprises," have correspondingly varied meanings. Thus, for example, a solvent "comprising" water may consist exclusively of water or may include one or more additional components (e.g. alcohol).

As used herein, the terms "polymers" and "polymeric material" will be understood to encompass prepolymers, oligomers, homopolymers, (e.g. prepared from a single monomer species), copolymers (e.g. prepared from at least two monomer species), terpolymers, graft polymers, plastic, elastomeric material, rubber materials, and mixtures thereof. In some embodiments, the polymeric material/s are synthetically made. In some embodiments the polymeric materials may be natural materials with carbon-carbon backbones e.g. natural rubber and derivatives thereof. The terms "polymers" and "polymeric material" as used herein will be understood to specifically exclude: lignocellulosic matter; naturally-occurring carbohydrate polymers; lignin; cellulose; hemicellulose; combinations of any two of lignin, cellulose, hemicellulose; lignite (brown coal); subbituminous coal; and any combination thereof.

As used herein, the term "continuous flow" refers to a process wherein a mixture comprising a feedstock (e.g. and any one or more of: an aqueous solvent, reagent, catalyst additive and/or oil additive, is subjected to:
 (a) heating and pressurisation to a target temperature and pressure,
 (b) treatment at target temperature(s) and pressure(s) for a defined time period (a "retention time"), and
 (c) cooling and de-pressurisation;
 during which the mixture is maintained in a stream of continuous movement along the length (or partial length) of a given surface of a reactor vessel. It will be understood that "continuous flow" conditions as contemplated herein are defined by a starting point of heating and pressurisation (i.e. (a) above) and by an end point of cooling and de-pressurisation (i.e. (c) above). Continuous flow conditions as contemplated herein imply no particular limitation regarding flow velocity or phase behaviour of the mixture provided that it is maintained in a stream of continuous movement.

As used herein, "end of life plastic" or "waste plastic" will be understood to mean plastic material containing at least some proportion of non-plastic contaminant(s) such as, for example, at least: 0.1%, 0.5%, 1%, 5%, 10%, 15%, 20%, 25%, 30%, 35%, 40%, non-plastic material. Non-limiting examples of such contaminants include dirt, paper, wood, food waste, soil, agricultural residues, metals, putrescible material, mineral matter, cardboard, plant and animal matter, fabric or fabric fibres.

As used herein, a "supercritical" substance (e.g. a supercritical solvent) refers to a substance existing at a temperature and a pressure that is above the critical point of the substance.

As used herein, a "subcritical" substance (e.g. a subcritical solvent) refers to a substance at a temperature and/or pressure below the critical point of the substance. Accordingly, a substance may be "subcritical" at a temperature below its critical point and a pressure above its critical point, at a temperature above its critical point and a pressure below its critical point, or at a temperature and pressure below its critical point.

As used herein, the term "aqueous solvent" refers to a solvent comprising at least one percent water based on total weight of solvent. An "aqueous solvent" may therefore comprise between one percent water and one hundred percent water based on total weight of solvent. An "aqueous solvent" will also be understood to include within its scope "aqueous alcohol", "aqueous ethanol", and "aqueous methanol".

As used herein, the term "intrinsic catalyst" will be understood to be a catalyst that is innately present in one or more other component/s of a reaction mixture processed according to the methods of the present invention and/or the materials of fabrication of the process (including mixer, vessel walls of a reactor apparatus in which the methods are performed, and/or, a catalyst that forms in situ during the performance of the methods.

As used herein, a "supplementary catalyst" is a catalyst included in a feedstock stream, solvent stream and/or reaction mixture that is supplementary to catalytic compounds intrinsically present other reaction mixture components (i.e.

supplementary to 'intrinsic catalysts'), being separately added to or contacted with the reaction mixture as a discrete/stand-alone component. The supplementary catalyst may be in the form of a fixed solid state catalyst positioned within the apparatus to contact the reaction mixture.

As used herein, the terms "reactor", "reactor apparatus", and are used interchangeably and have the same meaning. Each term encompasses any apparatus suitable for performing the methods of the present invention including, for example, continuous flow reactors and batch reactors. As used herein, the term "about" when used in reference to a recited numerical value includes the recited numerical value and numerical values within plus or minus ten percent of the recited value.

As used herein, the term "between" when used in reference to a range of numerical values encompasses the numerical values at each endpoint of the range.

Any description of prior art documents herein, or statements herein derived from or based on those documents, is not an admission that the documents or derived statements are part of the common general knowledge of the relevant art.

For the purposes of description, all documents referred to herein are hereby incorporated by reference in their entirety unless otherwise stated.

BRIEF DESCRIPTION OF THE FIGURES

Preferred embodiments of the present invention will now be described by way of example only, with reference to the accompanying figures wherein:

Figure One is a process flow diagram of an apparatus according to embodiments of the present invention.

Figure Two shows an indirect heater design according to embodiments of the present invention.

Figure Three is a process flow diagram showing an arrangement for removing solid materials from a pressurized reactor vessel.

Figure Four is a process flow diagram showing condenser stages proceeding the flash vessel according to embodiments of the present invention.

Figure Five is a process flow diagram showing a flash vessel coupled to a fractionation column according to embodiments of the present invention Figure Six provides a process flow diagram showing a flash vessel with fractionating column and additional vacuum distillation unit according to embodiments of the present invention Figure Seven shows a demister apparatus according to embodiments of the present invention Figure Eight shows boiler and indirect heater configuration according to embodiments of the present invention Figure Nine shows a naphtha product (upper, yellow layer) according to embodiments of the present invention which readily separates from aqueous solvent (lower layer).

Figure Ten is a graph depicting simulated product boiling point distribution of product arising from a full-temperature flash coupled to fractionating column.

Figure Eleven is an additional graph depicting simulated product boiling point distribution of product arising from a full-temperature flash coupled to fractionating column.

Figure Twelve is a further graph depicting simulated product boiling point distribution of product arising from a full-temperature flash coupled to fractionating column.

Figure Thirteen shows a pipe mixer design according to embodiments of the present invention Figure Fourteen shows a pipe mixer design with two static mixer elements according to embodiments of the present invention Figure Fifteen shows a pipe mixer design with four static mixer elements according to embodiments of the present invention Figure Sixteen shows a pipe mixer design according to embodiments of the present invention showing position of the bars Figure Seventeen shows a pipe mixer design with two mixer elements according to embodiments of the present invention Figure Eighteen shows a pipe mixer design with four mixer elements according to embodiments of the present invention Figure Nineteen is a bar chart showing volume uniformity of volume fraction of molten plastic according to embodiments of the present invention Figure Twenty depicts a configuration for combining supercritical water with polymeric material according to embodiments of the present invention in which a mixer is absent.

Figure Twenty-One depicts a configuration for combining supercritical water with polymeric material according to embodiments of the present invention including two mixer elements.

Figure Twenty-Two shows temperature profiles (downstream of injection point) arising from combining supercritical water with polymeric material according to embodiments of the present invention including two mixer elements.

Figure Twenty-Three is a process flow diagram of an apparatus according to embodiments of the present invention.

Figure Twenty-Four is a flow diagram of a pressure-letdown and fractionation system according to embodiments of the present invention. Figure Twenty-Five is a graph showing the results of a thermogravimetric analysis (TGA) of a total syncrude sample in nitrogen atmosphere.

Figure Twenty-Six shows an arrangement of part of pressure let down/fractionation system according to embodiments of the present invention.

DETAILED DESCRIPTION

The present invention provides processes and apparatuses for converting polymers or polymeric materials into a product or products.

By way of non-limiting example polymers or polymeric materials may be passed through an extruder apparatus and extruded at elevated temperature and pressure into a mixing zone where the extrudate can be mixed with a supercritical aqueous solvent. The mixture may optionally be further heated and may be passed through one or more reactors having a reaction zone with for a sufficient residence time for depolymerization and other chemical reactions to occur. The resulting product stream mixture can then be rapidly depressurized causing at least partial vapourisation of the product into component parts within, for example, a fractionating unit. At least part the heat energy initially held within the product stream mixture and released upon vapourisation can be used to fractionate the mixture into different boiling range fractions and/or to separate and recover the supercritical aqueous solvent from the product or products. Some of the fractionated material may optionally be recycled for re-fractionation. Catalysts or reagents may optionally be added at any stage in the process. Solid state catalysts may optionally be contained within the apparatus, especially within the reactors. Mixing devices, especially static mixers, may optionally be used, for example after the injection of the supercritical aqueous solvent. The solvent may also participate in chemical reactions to produce the product. Gases and non-condensable vapours formed in the chemical reactions are calorific and may be combusted, for example, in a purposely-designed boiler to provide heat energy to the process and/or to destroy chemicals that may be toxic and/or of environmental concern. Solid materials that are or become insoluble in the reaction mixture can be gravitationally separated during the process from the reaction mixture by means of their higher density and optionally removed from the process by means of valves at the bottom of the apparatus.

Polymeric Material

According to the methods of the present invention, polymeric material feedstock can be are treated. The polymeric material may comprise, for example, plastics. The polymeric material may be unsuitable for physical recycling methods. The polymeric material may be suitable currently only for landfill or for incineration. The polymeric material may be End of Life Plastics (ELP). The polymeric material (e.g. plastic) may be contaminated with non-plastic materials including, but not limited to, and one or more of food waste, soil, agricultural residues, metals, putrescible material, paper, cardboard, plant and animal matter, fabric or fabric fibres.

Non-limiting examples of polymeric materials suitable for use in the methods and apparatuses of the present invention include prepolymers, oligomers, homopolymers, copolymers, terpolymers, graft polymers, plastic, end of life plastic, waste plastic, elastomeric material, rubber materials, and mixtures may be included in the feedstock and subjected to cracking in the reactor. Other non-limiting examples include Polyethylene (PE), Low Density Polyethylene (LDPE), High Density Polyethylene (HDPE), Polypropylene (PP), Polyester, Poly(ethylene terephthalate) (PET), poly(lactic acid) PLA, Poly (vinyl chloride) (PVC), Polystyrene (PS), Polyamide, Nylon, Nylon 6, Nylon 6,6, Acrylonitrile-Butadiene-Styrene (ABS), Poly(Ethylene vinyl alcohol) (E/VAL), Poly(Melamine formaldehyde) (MF), Poly(Phenol-formaldehyde) (PF), Epoxies, Polyacetal, (Acetal), Polyacrylates (Acrylic), Polyacrylonitrile (PAN), Polyamide-imide (PAI), Polyaryletherketone (PAEK), Polybutadiene (PBD), Polybutylene (PB), Polycarbonate (PC), Polydicyclopentadiene (PDCP), Polyketone (PK), polycondensate, Polyetheretherketone (PEEK), Polyetherimide (PEI), Polyethersulfone (PES), Polyethylenechlorinates, (PEC), Polyimide, (PI), Polymethylpentene (PMP), Poly(phenylene Oxide) (PPO), Polyphenylene Sulfide (PPS), Polyphthalamide, (PTA), Polysulfone (PSU), Polyurethane, (PU), Poly(vinylidene chloride) (PVDC), Poly (tetrafluoroethylene) PTFE, Poly(fluoroxy alkane) PFA, Poly(siloxanes), silicones, thermosplastics, thermosetting polymers, natural rubbers, tyre rubbers, ethylene propylene diene monomer rubbers EPDM, chloroprene rubbers, acrylonitrile butadiene (nitrile) rubbers, polyacrylate rubbers, Ethylene Acrylic rubbers, Styrene-butadiene rubbers, Polyester urethane rubbers, Polyether urethane rubbers, Fluorosilicone rubbers, silicone rubbers, and copolymers, synthetic polymeric materials, naturally-occurring polymeric materials with carbon-carbon backbones, plastics, and mixtures thereof.

Without limitation, the polymeric material may comprise a low content of elements other than carbon, hydrogen and oxygen. For example, the polymeric material may contain less than about 5 wt % nitrogen, less than about 1 wt % nitrogen, less than about 0.5 wt % nitrogen, less than about 0.1 wt % nitrogen, or less than about 0.01 wt % nitrogen, as a percentage of total polymeric material weight.

Additionally or alternatively, the polymeric material may comprise less than about 5 wt % total halogens, less than about 1 wt % total halogens, less than about 0.5 wt % total halogens, less than about 0.1 wt % total halogens, less than about 0.05 wt % total halogens, or less than about 0.01% total halogens, as a percentage of total polymeric material weight.

Additionally or alternatively, the polymeric material may comprise a molar ratio of hydrogen to carbon (H/C) that is as high. For example, the H/C molar ratio may be greater than 2.15, greater than 2.0, greater than 1.8, greater than 1.6, greater than 14, greater than 1.2, greater than 1.0, or greater than 0.8.

In some embodiments, the polymeric material may be in the form of mixed or sorted waste plastics and in some cases may be contaminated with organic and inorganic impurities. The waste plastic material may require some pre-processing before being processed according to the methods of the present invention. For example, the waste plastic may require sieving or screening to remove abrasive particles.

Without limiting the mode of action polymers treated according to the methods of the present invention may be cracked to liquids having lower boiling and melting points and/or they may directly or indirectly act as sources of hydrogen which is then incorporated into the product liquids.

By way of non-limiting example a reaction mixture treated in accordance with the methods of the present invention may comprise at least: 1 wt %, 2 wt %, 3 wt %, 4 wt %, 5 wt %, 10 wt %, 15 wt %, 20 wt %, 25 wt %, 30 wt %, 35 wt %, 40 wt %, 45 wt %, 50 wt %, 60 wt %, 70 wt %, 80 wt %, 90 wt %, 95 wt %, or 98 wt %, polymeric material (as a percentage of the total weight of feedstock and/or reaction mixture).

By way of non-limiting example a reaction mixture treated in accordance with the methods of the present invention may comprise less than: 98 wt %, 95 wt %, 90 wt %, 80 wt %, 70 wt %, 60 wt %, 50 wt %, 45 wt %, 40 wt %, 35 wt %, 30 wt %, 25 wt %, 20 wt %, 15 wt %, 10 wt %, 5 wt %, 4 wt %, 3 wt %, 2 wt %, or 1 wt %, polymeric material (as a proportion of the total weight of feedstock and/or reaction mixture).

By way of non-limiting example a reaction mixture treated in accordance with the methods of the present invention may comprise between: about 2 wt % and about 70 wt %, about 2 wt % and about 60 wt %, about 2 wt % and about 50 wt %, about 2 wt % and about 40 wt %, about 2 wt % and about 30 wt %, about 5 wt % and about 70 wt %, about 5 wt % and about 60 wt %, about 5 wt % and about 50 wt %, about 5 wt % and about 40 wt %, about 5 wt % and about 30 wt %, about 10 wt % and about 70 wt %, about 10 wt % and about 60 wt %, about 10 wt % and about 50 wt %, about 10 wt % and about 40 wt %, about 10 wt % and about 30 wt %, about 15 wt % and about 70 wt %, about 15 wt % and about 60 wt %, about 15 wt % and about 50 wt %, about 15 wt % and about 40 wt %, about 15 wt % and about 30 wt %, polymeric material (as a proportion of the total weight of feedstock and/or reaction mixture).

In some embodiments feedstock polymeric material fed into the extruder and/or the reaction mixture comprises at least 30%, at least 40%, at least 50%, at least 60%, at least 70%, at least 80%, or at least 90% polyethylene by weight on a dry basis (db).

In some embodiments feedstock polymeric material fed into the extruder and/or the reaction mixture comprises at least 30%, at least 40%, at least 50%, at least 60%, at least 70%, at least 80%, or at least 90% polypropylene by weight on a dry basis (db).

In some embodiments feedstock polymeric material fed into the extruder and/or the reaction mixture comprises at least 30%, at least 40%, at least 50%, 60%, at least 70%, at least 80%, or at least 90% polystyrene by weight on a dry basis (db).

By way of non-limiting example, polymeric materials suitable for the methods of the present invention may have a melt mass-flow rate (MFR) of between 0.05 grams to 20 grams per 10 minutes, or 0.1 gram to 10 grams per 10 minutes, or 0.01 grams to 5 grams per 10 minutes as measured according to ISO 1133-1-2011 Plastics—Determination of the Melt Mass-Flow Rate (MFR).

Solvent Component

A reaction mixture for use in accordance with the methods of the present invention may comprise solvent such as, for example, an aqueous solvent.

In some embodiments the aqueous solvent comprises more than 5 wt %, more than 10 wt %, more than 20 wt %, more than 30 wt %, more than 40 wt %, more than 50 wt %, more than 60 wt %, more than 70 wt %, more than 80 wt %, more than 90 wt %, or more than 95 wt %, water as a proportion of the total weight of the reaction mixture. In some embodiments the aqueous solvent comprises less than 10 wt %, less than 20 wt %, less than 30 wt %, less than 40 wt %, less than 50 wt %, less than 60 wt %, less than 70 wt %, less than 80 wt %, less than 90 wt %, or less than 95 wt %, water (as a percentage of the total weight of the reaction mixture).

In some embodiments, water used in aqueous solvents of the present invention may be recycled from the product of feedstock comprising polymeric material previously treated by the method. For example, a portion of the water present following treatment of a given reaction mixture may be taken off as a side stream and recycled into the method (e.g. as some or all of a separate stream of supercritical solvent contacted with the extruded polymeric material).

The solvent may comprise or consist of one or more aqueous alcohol/s. Non-limiting examples of suitable alcohols include methanol, ethanol, isopropyl alcohol, isobutyl alcohol, pentyl alcohol, hexanol, iso-hexanol, and any combination thereof. By way of non-limiting example only, the solvent may comprise more than 5 wt %, more than 10 wt %, more than 20 wt %, more than 30 wt %, more than 40 wt %, more than 50 wt %, more than 60 wt %, more than 70 wt %, more than 80 wt %, more than 90 wt %, or more than 95 wt %, alcohol as a proportion of the total weight of the reaction mixture. In some embodiments the solvent may comprise less than 10 wt %, less than 20 wt %, less than 30 wt %, less than 40 wt %, less than 50 wt %, less than 60 wt %, less than 70 wt %, less than 80 wt %, less than 90 wt %, or less than 95 wt %, alcohol (as a percentage of the total weight of the reaction mixture).

Pre-Treatment of Polymeric Material

Although optional and not necessarily required, the polymeric material may be pre-treated prior to its inclusion a reaction mixture according to the present invention, including but not limited to, prior to undergoing extrusion in an extruder. This pretreatment may be carried out, for example, to prepare the material ready for extrusion, to remove contaminants and/or to control the specific polymers to be processed.

The pre-treatment of the polymeric material may comprise physical methods, non-limiting examples of which include grinding, chipping, pelletisation, granulisation, flaking, powdering, shredding, milling (e.g. vibratory ball milling), compression/expansion, agitation, density separation, washing, air classification, filtering, drying and/or pulse-electric field (PEF) treatment. The polymeric material may, for example, be pretreated using shredders, screens and/or sieves, magnetic and eddy current separators to remove metals, dry cleaning techniques and/or optical, infra-red, or ultraviolet and induction sorting to remove, for example, poly (vinyl chloride) and other chlorinated or halogenated polymers and metal.

The pre-treatment processes may be wet (i.e. involving washing with water or another solvent) or dry. The pre-treatment may include the use of air separators to remove glass, magnetic and/or eddy current separators to remove metals, dry or wet cleaning to remove food waste and paper, plastic drying using waste heat and/or optical, infra-red, or ultraviolet sorting to remove e.g. poly (vinyl chloride) and other chlorinated or halogenated polymers. Other types of polymeric materials that are unsuitable for particular aspects of the invention may also be removed by sorting technologies known in the art. Non-limiting examples of polymers that may be removed are polyethylene terephthalate (PET) and polyamides.

Additionally or alternatively, the pre-treatment of the polymeric material may comprise physio-chemical methods, non-limiting examples of which include pyrolysis, steam explosion, ammonia fibre explosion (AFEX), ammonia recycle percolation (ARP), and/or carbon-dioxide explosion. For example, steam explosion involves exposing the polymeric material to high pressure steam in a contained environment before the resulting product is explosively discharged to an atmospheric pressure. Pre-treatment with steam explosion may additionally involve agitation of the polymeric material.

Additionally or alternatively, the pre-treatment of the polymeric material may comprise chemical methods, non-limiting examples of which include ozonolysis, acid hydrolysis (e.g. dilute acid hydrolysis using $H_2SO_4$ and/or HCl), alkaline hydrolysis (e.g. dilute alkaline hydrolysis using sodium, potassium, calcium and/or ammonium hydroxides), and/or oxidative treatments.

Extrusion of Polymeric Material

Polymeric material treated in accordance with the methods of the present invention may be subjected to extrusion prior to forming the main reaction mixture. Extrusion of the polymeric material may be performed in any suitable extruder, non-limiting examples of which include single screw extruders, multi-screw extruders (e.g. twin screw extruders), intermeshing screw extruders, radial extruders, and roll-type extrusion presses. The multi-screw extruders may be counter-rotating or co-rotating. The extruder may comprise kneading disk/s and/or other screw element/s for mixing or dispersing the melt.

Suitable extruders typically may be from about 1 metre to about 50 metres in length and may be specifically designed for processing of waste plastic with a plastic compacting feature, with the pressure raising occurring as either a single extruder step or multi extruder steps, with or without extruder venting.

by way of non-limiting example, the energy needed by the extruder to heat the polymeric material can be provided by friction and/or shearing of the material in the extruder, and/or by heating elements. The extruder may comprise one or multiple series of heating zones.

The polymeric material may be heated in the extruder to temperature/s sufficient for the material to melt and flow. For example, the polymeric material may be heated in the extruder to more than 50° C., to more than 75° C., to more than 100° C., to more than 150° C., to more than 200° C., to more than 250° C., to more than 300° C., more than 350° C., or to more than 400° C. Accordingly, the polymeric material may be heated in the extruder, for example, to between about 250° C. and about 350° C., between about 275° C. and about 375° C., between about 300° C. and about 400° C., between about 50° C. and about 350° C., between about 50° C. and about 300° C., between about 50° C. and about 200° C., between about 50° C. and about 150° C., between about 80° C. and about 300° C., between about 80° C. and about 200° C., or between about 80° C. and about 150° C.

The residence time of the polymeric feedstock in the extruder may be, for example, about 30 seconds to about 20 minutes, about 2 minutes to about 6 minutes, or about 3 minutes to about 5 minutes.

The extruder may be fitted with a suitable feeder device (e.g. a hopper, compactor, cutter compactor) for application of the polymeric material to/into the extruder.

Additionally or alternatively, the extruder may be fitted with a die to facilitate the generation of back-pressure.

A molten stream of polymeric material may exit the extruder at a desired temperature and pressure. For example, the stream of material exiting the extruder may be: at a temperature of between about 150° C. and about 400° C. and a pressure of between about 200 bar and 350 bar; at a temperature of between about 250° C. and about 350° C. and a pressure of between about 250 bar and 350 bar; or at a temperature of between about 220° C. and about 280° C. and a pressure of between about 200 bar and 350 bar.

Combining Polymeric Material with Aqueous Solvent

According to the present invention, polymeric material (e.g. extrudate comprising or consisting of polymeric material) may be mixed with a solvent (e.g. an aqueous solvent) to form a reaction mixture. The solvent (e.g. may have been heated and/or pressurised prior to contacting the polymeric material. The solvent may be heated and/or pressurised using any suitable means.

For example, an aqueous solvent used in the methods of the present invention may be in a subcritical state or a supercritical state prior to and at the time of contacting the extruded polymeric material.

In some embodiments, the aqueous solvent is water or steam (e.g. supercritical water, superheated steam, or subcritical water).

Contacting a supercritical aqueous solvent with extruded polymeric material may initiate a supercritical to subcritical phase change in the aqueous solvent (i.e. bring it into a subcritical state as the temperature and/or pressure of the solvent falls below its critical point). The phase change may trigger a large release of energy which in turn may assist in successfully combining the aqueous solvent with the extruded polymeric material.

Alternatively, contacting a supercritical aqueous solvent with the extruded polymeric material may not initiate a supercritical to subcritical phase change in the aqueous solvent.

By way of non-limiting example only, the aqueous solvent may be supercritical (e.g. supercritical water), and may be at a temperature of between about 375° C. and about 800° C., between about 375° C. and about 600° C., between about 375° C. and about 550° C., between about 375° C. and about 500° C., or between about 375° C. and about 450° C. at the time of contacting the extruded polymeric material.

Combining the independently heated/pressurised solvent (e.g. aqueous solvent such as water) with the extruded polymeric material in accordance with the methods of the present invention may provide a means of generating a reaction mixture comprising a higher concentration of the extruded polymeric material than could be achieved, for example, (i) by mixing an equivalent amount of the polymeric material which has not been subjected to the aforementioned extrusion process with an equivalent amount of the independently heated and/or pressurised aqueous solvent; and/or (ii) by mixing an equivalent amount of the polymeric material which has not been subjected to the aforementioned extrusion process with an equivalent amount of the aqueous solvent, and heating/pressurising the mixture to the same levels.

In some embodiments, supercritical solvent including, for example, aqueous supercritical solvent such as water, may be applied to polymeric material extrudate at the point of exit from the extruder and/or at multiple injection points along a length of a vessel connecting the extruder to another apparatus or component thereof including, for example, a static mixing tank or the reaction zone of a reactor (e.g. a hydrothermal reactor, a continuous flow hydrothermal reactor). Such an arrangement may be used to promote additional mixing of the polymeric material extrudate and/or to maintain the extrudate at a high temperature.

Mixing

After the initial contacting of the extrudate with the aqueous solvent, mixing of the extrudate and the aqueous solvent may optionally be improved by using static mixing devices.

Accordingly the methods described herein may: encourage rapid heating of the polymeric material by close contact of hot solvent, and/or reduce overall system pressure losses through improved fluid flow properties, and/or include wide channels that are not blocked by material that has passed through the extruder, and/or avoid high stress in the pipe walls by the design of nozzles and solvent distribution system, and/or through catalytic material selection encourage the commencement of depolymerisation reactions. Additionally or alternatively the installation may include trace heating to avoid solidification of the polymeric material.

Pressurisation and Heating

A reaction mixture comprising polymeric material (e.g. an extrudate of polymeric material) and a solvent (e.g. an aqueous solvent such as water) according to the present invention may be heated and pressurised using known means in the art.

For example, pressurisation within an apparatus according to the present invention may be generated via an extruder and/or pump/s used to pressurise the aqueous solvent prior to contacting extruded polymeric material. In continuous flow systems, pressure will generally change from atmospheric to target pressure during the time it takes to cross the extruder and/or pump (i.e. close to instantaneous).

In some embodiments, the reaction mixture may be brought to a target temperature and/or pressure in a time period of between about 30 seconds and about 30 minutes.

In some embodiments, the reaction mixture may be brought to a target temperature and/or pressure in a time period less than about 15 minutes, less than about 10 minutes, less than about 5 minutes, or less than about 2 minutes.

In certain embodiments, the reaction mixture may be brought to a target pressure substantially instantaneously or over a time period of between about 30 seconds and about 30 minutes, and brought to a target temperature in less than about 20 minutes, less than about 10 minutes, or less than about 5 minutes, less than 2 minutes.

In other embodiments, the reaction mixture may be brought to a target pressure substantially instantaneously and brought to a target temperature in less than about two minutes. In other embodiments, the reaction mixture may be brought to a target pressure substantially instantaneously and brought to a target temperature in between about 1 and about 2 minutes, or less than 20 seconds.

In some embodiments of the invention the reaction mixture may optionally be further heated by means of one or more indirect heaters after mixing with the solvent (e.g. a supercritical aqueous solvent). The indirect heater(s) may, for example, raise the temperature of the reaction mixture by more than an additional 10, 20, 30, 40, 50, 60, 70, 80, 90 100, 120° C. or less than about an additional 150, 130, 110, 90, 70, 50° C. The indirect heating may increase the average temperature of the reaction mixture from about 380° C. to about 450° C. or about 400° C. to about 460° C.

In some embodiments, the indirect heaters are not circumferential.

In some embodiments the indirect heater provides heat energy to the reaction mixture by means of superheated steam or supercritical water from a process boiler. FIG. 2 shows one example of such a heater design. Without limitation, advantages of this design include that steam can be produced readily from the combustion of process gas and the temperature of the incoming steam can be readily controlled, thereby avoiding thereby avoiding excessive metal temperatures that would cause excessive charring of the plastic mixture. By using the steam that is ultimately fed into the process the pressure drop across the elements of each heater is minimal and any internal tube leak would be a small flow of steam into the process.

In some embodiments the additional indirect heating of the reaction mixture may be by means of electrical heating elements, and/or by a fluid heat exchanger and/or by a fluidized bed of, for example, ilmenite heated by combustion of calorific gas. In some embodiments, the heating elements are not circumferential. In some embodiments such calorific gas may comprise process gases and vapours formed by the depolymerization of polymeric material.

In some embodiments, the electric heating elements are not circumferential.

Reaction Parameters

Following mixture of the independently heated/pressurised aqueous solvent with the extruded polymeric material, the reaction mixture so formed can optionally be further heated and/or pressurised to reach and/or maintain desired reaction temperature and/or pressure levels.

For example, the reaction mixture may be fed into a reactor (e.g. a hydrothermal reactor, a continuous flow hydrothermal reactor) where the polymeric material is subjected to pre-determined levels of temperature and pressure for a pre-determined time period to facilitate its conversion into hydrocarbon product/s of lower average molecular weight than the polymeric material prior to conversion.

Thus, according to the methods of the present invention a reaction mixture comprising extruded polymeric material and an aqueous solvent may be treated at a target temperature (or within a range of target temperatures) and a target pressure (or within a range of target pressures) for defined time period ("retention time" or "residence time") to provide product/s.

The average residence or retention time may be determined or measured or constrained by the flow rate of the extrudate and/or the aqueous solvent.

The optimal reaction temperature/s and/or pressure/s for a given reaction mixture may be readily determined by the skilled addressee by preparing and running a series of reactions that differ only by temperature and/or pressure utilised and analysing the yield and/or quality of the product/s.

It will be understood that in certain embodiments an aqueous solvent used in the methods of the present invention may be heated and pressurised beyond its critical temperature and/or beyond its critical pressure (i.e. beyond the 'critical point' of the solvent) during treatment in the reactor. Accordingly, the solvent may be a 'supercritical' aqueous solvent if heated and pressurised beyond the 'critical point' of the aqueous solvent.

In some embodiments the aqueous solvent (e.g. water) in a reaction mixture with extruded polymeric material treated by the methods of the present invention may be heated and pressurised to level(s) above its critical temperature and pressure (i.e. above the 'critical point' of the aqueous solvent). Accordingly, the mixture may comprise a 'supercritical' aqueous solvent when performing the methods.

In other embodiments an aqueous solvent (e.g. water or superheated steam) in a reaction mixture with extruded polymeric material treated by the methods of the present invention may be heated and pressurised to level(s) below its critical temperature and pressure (i.e. below the 'critical point' of the aqueous solvent). Accordingly, the mixture may comprise a 'subcritical' aqueous solvent when performing the methods. For example, the 'subcritical' solvent may be heated and/or pressurised to level(s) approaching the 'critical point' of the solvent (e.g. between about 10° C. to about 50° C. below the critical temperature and/or between about 10 bar to about 50 bar below its critical pressure).

In still other embodiments, an aqueous solvent (e.g. water) in a reaction mixture with extruded polymeric material treated by the methods of the present invention may be heated and pressurised to levels both above and below its critical temperature and pressure (i.e. heated and/or pressurised both above and below the 'critical point' of the solvent at different times). Accordingly, the aqueous solvent of the mixture may oscillate between 'subcritical' and 'supercritical' states when performing the methods.

In certain embodiments, treatment of a reaction mixture comprising extruded polymeric material, an aqueous solvent (e.g. water), and optionally any one or more of: (i) supplementary catalysts, and/or (ii) oil, none of which are derived from the polymeric feedstock, aqueous solvent, or the walls of a reactor apparatus in which the treatment is carried out, and none of which are products generated in situ during the preparation and/or treatment of the reaction mixture, may be conducted at: temperature(s) of above 370° C. and pressure(s) of above 20 bar; temperature(s) of above 370° C. and pressure(s) above 40 bar; temperature(s) of above 370° C. and pressure(s) of above 60 bar; temperature(s) of above 370° C. and pressure(s) of above 80 bar; temperature(s) of above 370° C. and pressure(s) of above 100 bar; temperature(s) of above 370° C. and pressure(s) of above 120 bar; temperature(s) of above 370° C. and pressure(s) of above 140 bar; temperature(s) of above 370° C. and pressure(s) of above 160 bar; temperature(s) of above 370° C. and pressure(s) of above 180 bar; temperature(s) of above 370° C. and pressure(s) of above 200 bar; temperature(s) of above 370° C. and pressure(s) of above 220 bar; temperature(s) of above 370° C. and pressure(s) of above 240 bar; temperature(s) of above 370° C. and pressure(s) of above 260 bar; temperature(s) of above 370° C. and pressure(s) of above 280 bar; temperature(s) of above 370° C. and pressure(s) of above 300 bar; temperature(s) of above 370° C. and pressure(s) of above 350 bar; temperature(s) of above 400° C. and pressure(s) of above 20 bar; temperature(s) of above 400° C. and pressure(s) above 40 bar; temperature(s) of above 400° C. and pressure(s) of above 60 bar; temperature(s) of above 400° C. and pressure(s) of above 80 bar; temperature(s) of above 400° C. and pressure(s) of above 100 bar; temperature(s) of above 400° C. and pressure(s) of above 120 bar; temperature(s) of above 400° C. and pressure(s) of above 140 bar; temperature(s) of above 400° C. and pressure(s) of above 160 bar; temperature(s) of above 400° C. and pressure(s) of above 180 bar; temperature(s) of above 400° C. and pressure(s) of above 200 bar; temperature(s) of above 400° C. and pressure(s) of above 220 bar; temperature(s) of above 400° C. and pressure(s) of above 240 bar; temperature(s) of above 400° C. and pressure(s) of above 260 bar; temperature(s) of above 400° C. and pressure(s) of above 280 bar; temperature(s) of above 400° C. and pressure(s) of above 300 bar; temperature(s) of above 400° C. and pressure(s) of above 350 bar temperature(s) of above 374° C. and pressure(s) of above 221 bar; temperature(s) of above 375° C. and pressure(s) of above 225 bar; temperature(s) of between 370° C. and 550° C. and pressure(s) of between 20 bar and 400 bar; temperature(s) of between 374° C. and 500° C. and pressure(s) of between 221 bar and 400 bar; temperature(s) of between 374° C. and 550° C. and pressure(s) of between 221 bar and 400 bar; temperature(s) of between 375° C. and 550° C. and pressure(s) of between 221 bar and 400 bar; temperature(s) of between 375° C. and 550° C. and pressure(s) of between 221 bar and 400 bar.

In certain embodiments treatment of a mixture comprising extruded polymeric material and an aqueous solvent (e.g. water) using the methods of the invention may be conducted at: temperatures of between 400° C. and 550° C. and pressures of between 100 bar and 300 bar.

In certain embodiments, the reaction mixture may be treated at a temperature between 370° C. and 500° C., between 370° C. and 480° C., between 374° C. and 500° C., between 380° C. and 500° C., between 380° C. and 450° C., between 400° C. and 480° C., or between 440° C. and 480° C.; and the pressure may be more than 100 bar.

In some embodiments the reaction mixture may be treated at a temperature greater than about: 350° C., 360° C., 370° C., 380° C., 390° C., 400° C., 410° C., 420° C., 430° C., 440° C., 450° C., 460° C., 470° C., or 480° C. In some embodiments the reaction mixture is treated at any one of the temperatures referred to in this paragraph and at a pressure that is greater than about: 180 bar, 200 bar, 220 bar, 240 bar, 260 bar, 280 bar, 300 bar, or 320 bar.

In certain embodiments, the pH of the polymeric material melt stream/extrudate, supercritical aqueous solvent, and/or reaction mixture may be maintained at a pH of more than: 6, 7, 8, 9, 10 or 11, for example, by the addition of base. This may serve to minimise acid-catalysed isomerization and/or hydration reactions of alkenes, especially of 1-alkenes, during the process. The pH may be measured after the depressurization of the product stream. The pH may be measured after the cooling of the product stream to a temperature of less than 100° C.

Retention Time

The specific time period over which a reaction mixture of the present invention comprising polymeric material (e.g. an extrudate of polymeric material) and a solvent (e.g. an aqueous solvent) may be treated at a target temperature and pressure (i.e. the "retention time") to provide products may depend on a number different factors including, for example, the type of polymeric material under treatment and the relative proportions or types of components in the reaction mixture (e.g. the proportion of aqueous solvent, additive catalyst(s), and/or any other additional component/s), and/or the type of apparatus in which the methods are performed. These and other factors may be varied in order to optimise a given method so as to maximise the yield of certain products and/or reduce the processing time. Preferably, the retention time is sufficient to convert or substantially all of the polymeric material used as a feedstock into hydrocarbon product/s.

In certain embodiments, the retention time is less than about 60 minutes, 45 minutes, 30 minutes, 25 minutes, 20 minutes, 15 minutes, 10 minutes or less than about 5 minutes. In certain embodiments, the retention time is more than about 60 minutes, 45 minutes, 30 minutes, 25 minutes, 20 minutes, 15 minutes, 10 minutes or more than about 5 minutes. In other embodiments, the retention time is between about 1 minute and about 60 minutes. In additional embodiments, the retention time is between about 5 minutes and about 45 minutes, between about 5 minutes and about 35 minutes, between about 10 minutes and about 35 minutes, or between about 15 minutes and about 30 minutes. In further embodiments, the retention time is between about 20 minutes and about 30 minutes.

The optimal retention time for a given set of reaction conditions as described herein may be readily determined by the skilled addressee by preparing and running a series of reactions that differ only by the retention time, and analysing the yield and/or quality of upgraded product generated.

The average residence or retention time may be determined or measured or constrained by the flow rate of the extrudate and/or the aqueous solvent.

In some embodiments the retention time in the reactor, calculated assuming plug flow of a fluid with the density of an idealised mixture of water plus oil derived from polymeric material, at the reaction temperature, is about 30 seconds, about 1 minute, about 2 minutes, about 5 minutes, between 5 minutes and 10 minutes, between 10 minutes and 20 minutes, between 20 minutes and 30 minutes, between 30 minutes and 40 minutes, greater than 40 minutes, or less than about 60 minutes.

Removal of Solids

One non-limiting advantage of the present invention is that it can provide a means for removing from the process stream materials that are solids at the reaction temperature and pressure. Without limitation solids may be mineral matter contained within the polymeric feedstocks such as fillers, opacifiers, pigments, rheology modifiers and the like. The solids may be ash. The solids may be contaminants in the feedstock such as, for example, glass, small stones, metal particles, or metal foil pieces. The solids may be carbon-containing materials formed during chemical reactions in the process. The solids generally have a higher density than the process fluids at the reaction temperature and pressure and (in vertical reactors) solid particles will settle under gravity under conditions where the particle sedimentation velocity is greater than the fluid flow velocity.

By way of non-limiting example, calculations made by the present inventors have shown that particles with a material density of 2700 kg/m$^3$ (e.g. calcium carbonate) and with a diameter of larger than about 20 microns, have a sedimentation velocity of about 2.5 mm/s when subjected to the methods described herein at about 450° C. and about 200 bar, and using about 60% polyolefin plastic feed with 40% water by mass.

The upflow velocity of the reaction fluid may, for example, be in the range of 1 to 1000 mm/s in a vertical reactor tube fed from the bottom. Particles of diameter greater than about 10 or 20 or 50 microns diameter of density greater than about 1000 kg/m$^3$ may be expected to settle in vertical reactor under the conditions of the method, depending on the fluid upflow velocity and the nature of the flow regime (e.g. turbulent or laminar flow conditions). Solid particles settling in the lower parts of (vertical) reactors may be optionally periodically or intermittently, on demand in a controlled manner, ejected from the reactor bottoms by the brief operation of blowdown valves at the base of the vessels.

A simplified diagram showing one non-limiting operation of a solids removal system is shown in FIG. 3. In the scheme shown in FIG. 3 the system design is to drain a defined amount into a sealed pressurized catch pot so as to prevent depressurisation of the reactor and to provide a means of quantifying the amount to be removed. The sealed pot would then be depressurised into the vent system and then emptied info a final pot inerted with an inert gas system for further processing. The purpose is to prevent hydrocarbon oils associated with the removed solids from catching fire, for example if they are above their auto-ignition temperature in air. For example the final pot may be a metal skip with a lid. Interlocks on the catch pot may be designed to test the integrity of valves as part of the sequence. Only when depressurised would the catch pot empty into the final pot. In some embodiments of such a design every drain would have double isolation, this will be achieved by having an isolation valve on the pipe at the base of each reactor and then a common isolation valve prior to the catch pot and the final pot. In normal operation the contents of the reactor will be above the auto ignition temperature of the product oil. Additionally significant quantities of vapour will potentially be released—the downstream systems is designed to mitigate the applicable risks. Without this method for removing solids the downstream apparatus comprising the depressurization valve(s) can lead to rapid fouling, necessitating cleaning operations at a frequency rendering operation of the plant uneconomic. Optionally solids removed in this manner may be combined with residue from the fractionation of the product and used as bitumen and asphalt blendstocks or additives. Optionally solids removed in this manner may be further refined to recover metals by means known in the art.

Depressurisation and Fractionation

According to embodiments of the present invention a reaction mixture may be converted into a product stream that can be depressurized by means of a flash depressurization at the reaction temperature. The flash depressurization may constitute a form of heat recovery, wherein the heat energy released during depressurization may be used to fractionate the product into at least two different boiling ranges using, for example, a distillation column directly connected to the flash depressurization unit. The fractionation process would otherwise require the product stream to be later heated under vacuum in e.g. a vacuum distillation unit, requiring energy input.

In certain embodiments the reaction mixture may be flash depressurized from a temperature of at least 350° C., 375° C., 400° C., 410° C., 420° C., 430° C., 440° C., 450° C. or at least 460° C. and a pressure of at least 200 bar, 220 bar, 240 bar, 260 bar, 280 bar, 300 bar to a pressure of less than 25 bar, 20 bar, 15 bar, 10 bar, 8 bar, 6 bar, 4 bar, 2 bar, 1.5 bar, 1.2 bar absolute.

In certain embodiments the flash depressurization may be regulated by means of one or more valves.

In the present invention the depressurized stream is directed into a depressurization and fractionation vessel or vessels wherein the stream is fractionated into at least three boiling range fractions plus a gas and/or vapour stream. A part of the energy in the process stream fluids is thereby used to fractionate the product stream into product fractions e.g. gas/vapour, naphtha, middle distillate or gas oil, heavy gas oil, heavy wax residue.

In certain embodiments the depressurization-fractionation apparatus may comprise a flash vessel and two or more condensers in series as exemplified in FIG. 4. In the case where two condensers are used, the first condenser may be employed to condense distillates boiling in the range approximately 200° C. to 400° C. AEBP, or 450° C. or 500° C. AEBP, the second condenser may be employed to condense distillates boiling in the range approximately 20° C. to 200° C. AEBP, and fractions boiling above about 400° C. or 450° C. or 500° C. AEBP may be retained in the bottom of the flash vessel and periodically or continually drained to storage vessels. Water may be separated from the output of the second condenser by means of decantation, the water being more dense than and immiscible with the liquid products.

In certain embodiments the depressurization-fractionation apparatus comprises a flash vessel and a fractionating column in series as exemplified in FIG. 5 In certain embodiments the vessel comprising fractionation column may act also as the flash vessel (i.e. the fractionating column is itself a flash vessel). The fractionating column may be used to separate product fractions into at least three boiling ranges. The boiling ranges may be, for example, about 20° C. to about 200° C. AEBP, about 200° C. to about 360° C. AEBP, about 360° C. to about 400° C. AEBP, about 360° C. to about 450° C. AEBP, or 360° C. to about 500° C. AEBP. Gases and vapours not condensed by the primary condenser may be directed to a boiler and/or a flare for combustion. Water may be separated from the lowest boiling liquid fraction (e.g. the fraction boiling from about 20° C. to about 200° C. AEBP) or other liquid fractions by means of a separator. The separator may, for example, be a gravity plate separator, an API-separator, an electrostatic separator. Alternatively or additionally the separator may be an enhanced gravity separator e.g. a centrifuge, a decanter centrifuge, or a hydrocyclone. Fractions boiling above about 500° C. AEBP may be retained in the bottom of the flash vessel and periodically or continually drained to storage vessels.

In certain embodiments steam or superheated steam or supercritical water may be additionally introduced into the depressurization vessel in order to facilitate fractionation of the liquid products.

The processes of heating/pressurisation and cooling/depressurisation and fractionation can be performed in a continuous flow system (see section below entitled "Continuous flow").

The fractionating column may contain distillation trays for the separation of condensed liquid product.

The fractionating column may fractionate the product stream into different boiling ranges. As referred to herein, boiling points will be taken to mean atmospheric equivalent boiling points (AEBP) unless otherwise stated. For example, the fractionating column may separate the product stream by boiling range into a naphtha fraction boiling between about 70° C. and about 210° C. AEBP and a distillate gas oil fraction boiling between about 210° C. and about 360° C. AEPB and a heavy gas oil fraction boiling between about 360° C. to about 400° C. AEBP, about 360° C. to about 450° C. AEBP, or 360° C. to about 500° C. AEBP. The gas oil and heavy gas oil fractions may be wholly or partly waxy solids at 25° C. Gases and vapours not condensing in the column may pass to a condenser which may condense a low boiling oil (naphtha fraction). The naphtha fraction and any other condensed fractions may be wholly or partly recirculated into the fractionating column. The gases and vapours passing the condenser may be directed to the boiler whereupon the gases may be combusted producing the supercritical aqueous solvent, optionally with the addition of an additional fuel gas such as natural gas. The combustion may recover energy from the gas and can destroy any compounds of environmental concern in the combustion process. Optionally, some or all of the gases and vapours may be directed to a flare. The flare may be an enclosed flare.

In some embodiments, a non-distillable part of the product stream (heavy wax residue), having a boiling point of e.g. >500° C. may be continuously or intermittently removed from the bottom of the depressurisation vessel (located at the bottom of the fractionating column).

It will be evident to those skilled in the art that the fractionating column may be operated in a manner known in the field to provide desired boiling ranges for the product fractions.

In some embodiments the non-distilled residue from the flash vessel and/or the fractionating column may be optionally distilled in a vacuum distillation unit to provide a vacuum gas oil fraction and a heavy residue as shown in FIG. 6. The boiling range of the VGO fraction may be e.g. 360° C. to 650° C. AEBP.

In some embodiments of the present invention the lower part of the flash column can be a demister. Without any particular limitation, the mixture entering the flash column after being pressure reduced from very high pressure to near atmospheric pressure may predominantly be in the gaseous phase with liquid droplets of high boiling hydrocarbons comprising an aerosol. The design of the lowest section of the flash column is therefore to act as a demister separating the high boiling hydrocarbon droplets from the gaseous mixture.

On entry into the column the product gas stream may be forced by a baffle plate to make a sharp turn, whilst the gas turns, the momentum of the droplets mean that they impact on the baffle plate where they coalesce and flow downwards as a liquid in to bottom of the flash column. A non-limiting example of an apparatus suitable for the method is shown in FIG. 7.

The flash column base may have a diameter sufficiently large to ensure a very low upward velocity within that section of the column. The diameter at the base of the column may be selected so that the largest droplets that are carried by the gaseous phase are about 50 microns or about 40 microns or about 30 microns or about 20 microns or about 10 microns or about 5 microns in diameter. Droplets larger than about this diameter may not be transported upwards and fall into the liquid residue at the base of the column.

Combustion of Process Gas

In some aspects of the present invention, the gaseous products of the methods described herein (including non-condensable vapours) may be combusted to provide energy for the generation of the supercritical aqueous solvent, for example, in a supercritical fluid boiler. The supercritical fluid boiler may be specifically designed for the purpose of combusting the process gas at temperatures that destroy quantities of pollutants of environmental concern. Such pollutants may include, for example, sulphides, haloalkanes, haloarenes, haloalkenes, and/or polychlorinated dibenzo-p-dioxins.

It is known in the art and prescribed in environmental regulations in certain jurisdictions (e.g. UK, EU, European Industrial Emissions Directive) that in order to assure the destruction of species mentioned above the combustion gases must be held for a residence time exceeding 2 seconds at a temperature equal to exceeding 850° C. in the presence of excess oxygen.

In some embodiments of the present invention, process gas along with air and recycled flue gas from the boiler exhaust may be combusted within a secondary chamber e.g. an uncooled refractory lined chamber, which is sufficiently large to provide 2 seconds residence time with the flue gases above 850° C. The refractory may separate the metal of the boiler from the potentially harsh corrosive environment of cyclic oxidising reducing atmosphere near to the burner flame. The cycling between oxidising and reducing conditions is known in the art to increase the rate of chloride corrosion of steel. The recirculated flue gas can be employed to avoid overheating the chamber and to minimise the production of nitrogen oxides (NOx emissions). It may also lead to lower metal temperatures (hence low corrosion rates) when the flue gases are presented to the rows of boiler tubes. To provide the required volume the bespoke boiler design comprises an uncooled horizontal refractor lined section that is sufficiently long to allow the burner flame to finish without impacting the boiler walls. It is then followed by a larger vertically arranged boiler section. Optionally or additionally this system may be combined with a selective catalytic reduction system for the control of NOx, meaning that the plant is able to achieve tight emission limits applicable to gas fired boilers.

A non-limiting example of a suitable boiler indirect heater configuration for the means of combusting process gases and vapours and/or natural or other calorific gas and supplying heat energy to the reaction mixture according to the method of the present invention is shown in FIG. 8. Here, process gases and vapours from the depolymerization of polymeric material and optionally other calorific gases are combusted by means of the burner. The hot combustion products are held in the refractory lined chamber for a minimum of 2 seconds residence time at a minimum temperature of 850° C. The hot gases heat pressurized aqueous solvent in the tubes in a water-walled refractory lined furnace box that slowly cools the process gas. The aqueous solvent is thereby heated to a temperature above 374° C. and below about 600° C., thereby generating a supercritical aqueous solvent stream. The supercritical aqueous solvent is fed to the mixer to be mixed with the polymeric feedstock and optionally or additionally to one or more indirect heaters to further heat the reaction mixture. Once the steam has passed through the indirect heaters the cold steam is returned to the boiler to be reheated. The steam is passed through convective heat transfer tubes located within the second pass of the boiler where the hot gases from the boiler heat the steam. Once reheated the steam is once again used within the next pair of indirect heaters before being reheated once more. Many phases of reheat may be used to obtain the required heat transfer to the polymeric material plus aqueous solvent mixture, e.g. four phases.

In some embodiments the steam supply to the indirect heaters may be on a separate circuit to the supercritical aqueous solvent supply to the mixer, at a lower pressure e.g. 2 bar, 5 bar, 10 bar or 20 bar, or 50 bar or 100 bar, less than 221 bar. The temperature of the steam exiting the boiler may be at least 450° C., at least 470° C., at last 500° C., less than 520° C., less than 550° C.

In some embodiments, the indirect heaters are not circumferential.

Separation of Aqueous Solvent

The fractionating columns described herein may provide a means of separating the aqueous solvent from the products. Without this fractionation, separation of the aqueous solvent from the product may be difficult or not possible.

Without limitation, the depolymerization products of a plastic feedstock material may contain significant wax fractions and/or may have a high viscosity at ambient temperatures (e.g. at 25° C.). The aqueous solvent may be physically entrained into the waxy products and accordingly, emulsion breaking chemicals in combination with centrifugation or assisted gravitational decantation may be required to separate the aqueous solvent. One advantage of the present invention may be that the aqueous solvent separates readily from the low boiling (naphtha) product fraction after fractionation as illustrated in FIG. 9. The aqueous solvent is more dense than, and insoluble in, the product fraction and may readily be separated under normal gravity by means known in the art such as decantation. A further advantage of the present invention may be that the aqueous solvent separated in this manner contains low concentrations of suspended solids and metals and soluble organic compounds. The total organic carbon (TOC) content measured according to European standard EN 1484 method may be less than 10,000 mg/l, less than 5000 mg/l, less than 2500 mg/l, less than 1000 mg/l, less than 500 mg/l. The low organic content of the separated aqueous solvent means that the aqueous solvent can readily be treated for discharge into the environment. Without limitation, the aqueous solvent may be discharged to the environment or recycled as solvent.

Continuous Flow

Methods according to the present invention are performed under conditions of continuous flow.

Performing the process of the invention under conditions of continuous flow may provide a number of advantageous effects. For example, continuous flow may facilitate the accelerated implementation and/or removal of heat and/or pressure applied to a reaction mixture. This may assist in achieving the desired rates of mass and heat transfer, heating/cooling and/or pressurisation/de-pressurisation. Continuous flow may also allow the retention time to be tightly controlled. Without limitation to a particular mode of action, it is postulated that the increased speed of heating/cooling and/or pressurisation/de-pressurisation facilitated by continuous flow conditions along with the capacity to tightly regulate retention time assists in preventing the occurrence of undesirable side-reactions (e.g. re-polymerisation, char formation) as the reaction mixture heats/pressurises and/or cools/de-pressurises. Continuous flow is also believed to enhance reactions responsible for converting polymeric materials into hydrocarbon products by virtue of generating mixing and shear forces believed to aid in emulsification.

Accordingly the methods of the present invention are performed under conditions of continuous flow. As used herein, the term "continuous flow" refers to a process wherein:

(i) reaction mixture precursors (e.g. polymeric material undergoing extrusion, aqueous solvent, and optionally catalyst, and/or oil streams) are maintained in a stream of continuous movement into the reactor apparatus;

(ii) reaction mixtures are maintained in a stream of continuous movement through the reactor apparatus; and (iii) product stream/s are maintained in a stream of continuous movement out of the reactor apparatus Accordingly, in a continuous flow system the reaction mixture is maintained in a stream of continuous movement along the length (or partial length) of a given surface of reactor apparatus from the point of entry into the reactor to the point of exiting the reactor.

Continuous flow conditions as contemplated herein imply no particular limitation regarding flow velocity of a reaction mixture provided that it is maintained in a stream of continuous movement.

Continuous flow conditions may be facilitated, for example, by performing the methods of the invention in a suitable reactor apparatus. A suitable reactor apparatus will generally comprise heating/cooling, pressurising/de-pressuring and reaction components in which a continuous stream of reaction mixture is maintained.

The use of a suitable flow velocity (under conditions of continuous flow) may be advantageous in preventing scale-formation along the length of a particular surface that the reaction mixture moves along (e.g. vessel walls of a reactor apparatus) and/or generating an effective mixing regime for efficient heat transfer into and within the reaction mixture.

Additional Reagents and Catalysts

Optionally, additional (i.e. supplementary) reagent/s and/or catalyst/s may be added to the process.

In some embodiments the supplementary reagent/s and/or catalyst/s may be solid at room temperature, and may be mixed with the polymeric feedstock prior to the polymeric material entering an extruder. In some embodiments the additive may be solid at room temperature and may be mixed with the polymeric feedstock within an extruder by means of a suitable port.

In some embodiments the supplementary catalysts may be a solid calcium salt chosen from calcium oxide, calcium hydroxide, calcium carbonate, calcium bicarbonate. In some embodiments the supplementary catalysts may be a solid base chosen from sodium hydroxide, potassium hydroxide, sodium carbonate, potassium carbonate, lithium hydroxide, lithium carbonate, magnesium oxide, magnesium hydroxide, barium oxide and barium hydroxide.

Without limitation to a mode of action, the additive may react with organic halides or with halogen-containing species, e.g. hydrogen chloride, to form inorganic halides. The inorganic halides may be removed as solids by blowdown in the hydrothermal reactors.

Without limitation to a mode of action, the additive may accelerate the decomposition of compounds such as terephthalic acid (TPA) and/or benzoic acid (BA), formed from the decomposition or depolymerization of poly (ethylene terephthalate) present in the polymeric feedstock. The TPA and BPA may be decomposed to other aromatic compounds including but not limited to benzene, toluene, benzophenone and benzaldehyde. The additive may be removed as solid by blowdown, the form of the additive may have changed by chemical reaction prior to said removal.

In some embodiments the supplementary reagent/s and/or catalyst/s may be added in liquid form (e.g. as aqueous solutions). The liquids may be added under pressure using a high pressure dosing pump or similar means. The liquid may be added at any stage of the process prior to the depressurization step. The liquid may be added to the extruder, between the extruder and the supercritical aqueous fluid addition point(s), after the supercritical aqueous fluid addition point(s) but before the additional heating stages if present, or before any of the reactor vessels, or before the depressurization stage.

In some embodiments of the present invention, base may be included in the polymeric material melt stream/extrudate, aqueous solvent stream and/or reaction mixture. There is no particular restriction on the type or form of base that may be used or the point/s in the process that it may be introduced. By way of non-limiting example, the base may be introduced, for example, as a solid co-feed to the extruder with the polymeric material and/or as a liquid form at any point after the extrusion stage (e.g. to the extrudate/melt stream, to the aqueous solvent stream, and/or directly to the reaction mixture). In a continuous or semi-continuous version of the process of the invention, at least some base may be added prior to the final reactor leg.

Non limiting examples of bases suitable for this purpose are carbonates, hydroxides, hydrogen carbonates, oxides of Group I and Group II metals and materials containing significant quantities thereof (e.g. black liquor, white liquor, green liquor, red mud, limestone, calcite).

A reaction mixture for use in accordance with the methods of the present invention may comprise catalysts which may enhance the formation of desired products.

The catalysts may be 'intrinsic catalysts' which are derived from other components of the reaction mixture itself (e.g. from the polymeric material, aqueous solvent, any other reaction mixture component), will be understood to be generated in situ during the treatment of the reaction mixture in accordance with the methods of the present invention, and/or are derived from the mixer materials and walls of a reactor apparatus within which the reaction mixture is treated. For example, the catalysts may be hydronium/hydroxide ions of water in the reaction mixture, compound/s in the polymeric material and/or transition/noble metals from the reactor vessel walls. Waste plastic polymers treated according to the methods of the present invention may have contaminants with catalytic activity.

Additionally or alternatively, the catalysts may be 'supplementary catalysts' which are not derived from other components of the reaction mixture itself, are not generated in situ during the treatment of the reaction mixture in accordance with the methods of the present invention, and are not derived from the materials of construction or the walls of a reactor apparatus within which the reaction mixture is treated. Rather, the supplementary catalysts are separately added to the reaction mixture as a discrete/stand-alone component, and are thus additional to intrinsic catalysts present in the reaction mixture.

Although the addition of supplementary catalysts may be advantageous in certain circumstances, the skilled addressee will recognise that the methods of the invention may be performed without using them.

A supplementary catalyst as contemplated herein may be any catalyst that enhances the formation of the desired hydrocarbon products such as fuels and chemicals from polymeric material feedstocks using the methods of the invention, non-limiting examples of which include base catalysts, acid catalysts, alkali metal hydroxide catalysts, transition metal hydroxide catalysts, alkali metal formate catalysts, transition metal formate catalysts, reactive carboxylic acid catalysts, transition metal catalysts, sulphide catalysts, noble metal catalysts, water-gas-shift catalysts, metals supported on nitrogen doped carbon materials, and combinations thereof.

Without being limited to theory, supplementary base catalysts may play a multiple role in that they may enhance product formation and also control pH, which may be advantageous for reducing corrosion rates in reactor metal components, and may promote the precipitation of halogens contained in the feedstock as metal halides that are insoluble or sparingly soluble in supercritical water. Upon cooling and depressurisation the metal halides can re-dissolve in the water phase. This action is advantageous because the halogens, in particular chlorine, may effectively be removed from the gas phase and/or from the oil phase. Chlorines are undesirable in gas and oil phases because they may ultimately form dioxins and other environmental pollutants if incompletely combusted in a subsequent process.

In some embodiments, supplementary catalysts known in the art to promote water-gas shift (WGS) reactions may be included in the reaction mixture to promote hydrogen transfer from water to oil products. Any WGS catalysts or hydrogen transfer catalysts known in the art may be utilised. Without limitation the catalysts may be in the form of a finely dispersed solid added to the extruder feed. Additionally or alternatively, they may be in the form of a fixed bed. Additionally or alternatively, they may be homogenous when present in a reaction stream (e.g. aqueous solvent, polymeric material extrudate, and/or reaction mixture) under subcritical conditions and/or supercritical conditions.

Without being bound by theory, the addition of WGS and/or hydrogen transfer catalysts may increase the degree of saturation of hydrocarbons in the product. This may be desirable as the cetane number of middle distillates in the product may increase and the proportion of n-paraffins in the wax fractions in the product may also increase, making the waxes valuable by virtue of their high purity and sharp and discrete melting point ranges.

Solid Metal Catalysts

In some embodiments of the invention solid metal catalysts are contacted with the reaction stream.

In some embodiments the solid metal catalysts are fixed metal surfaces within the reactor vessels. The solid metal catalysts may be, for example, wires, meshes, foils, and shapes known in the art such as Raschig rings.

In some embodiments the solid metal catalysts comprise nickel. In some embodiments the nickel is in a formal zero oxidation state. The nickel may be present as an alloy with other metals e.g. as stainless steel 310 or 316.

Without being bound by theory, the nickel may facilitate the transfer of hydrogen from the aqueous solvent to the depolymerization products of the polymeric feed.

It will be appreciated by persons of ordinary skill in the art that numerous variations and/or modifications can be made to the present invention as disclosed in the specific embodiments without departing from the spirit or scope of the present invention as broadly described. The present embodiments are, therefore, to be considered in all respects as illustrative and not restrictive.

The PTT and Film materials were mixed in various proportions as described in Table 1 and depolymerized in a continuous flow reactor consisting of, in series, an extruder, a supercritical water injection zone, a series of heaters, three or four reactors, a cooler, a depressurization stage, and one or more product tanks. Experimental conditions are given in Table 1. The depolymerization products were synthetic crude oils. Samples of the synthetic crude oils were dried in the laboratory to remove water and their boiling ranges were characterized by simulated distillation according to the method of ASTM D7169 and by vacuum distillation approximating the method of ASTM D1160. The simulated distillation results are given in Tables 2 to 4. The simulated distillation curves were used to construct a model of the flash distillation and fractionation behaviour of the synthetic crude oils in a flash depressurization from the full reaction temperature and pressure into a fractionating column. The simulation was performed using HYSYS software by AspenTech. The resulting boiling point distributions of four fractions are shown the three cases modelled in FIGS. 10, 11 and 12. The modelling assumed a mass flow out of the reactor of 3893 kg/hr and a fractionating column of 1.2 m diameter.

TABLE 1

Parameters of Experiments to Produce Synthetic Crude Oils by Depolymerization of Post-Consumer Plastics

| Trial No. | Proportion of PTT in Polymer feed | Proportion of Film in Polymer Feed | Polymer/water mass ratio | Reaction Temperature ° C. | Reaction Pressure Bar | Extruder Outlet Temperature ° C. | Supercritical Water Temperature at Mixing Zone ° C. |
|---|---|---|---|---|---|---|---|
| 1 | 1 | 1 | 48/51 | 440 | 220 | 350 | 510 |
| 2 | 2 | 1 | 68/32 | 440 | 220 | 350 | 510 |
| 3 | 3 | 1 | 65/35 | 435 | 220 | 350 | 500 |

EXAMPLES

The present invention will now be described with reference to specific Example(s), which should not be construed as in any way limiting.

Example One

The behaviour of a flash depressurization coupled to a fractionating column was demonstrated as follows. Post-consumer plastics of two broad types were prepared for extrusion. Hard plastics from post-consumer collection known as PTT (Pots, Tubs and Trays, e.g. food containers, personal hygiene product containers, toys, laundry baskets, milk carton crates) were chipped or shredded into approximately 1-20 mm sizes. Metals were removed by magnetic and eddy-current separation. Denser-than water plastics (e.g. PVC, PET) were mostly removed by flotation over water. The chipped PTT plastics were de-watered by centrifugation and bagged in preparation for extrusion. Soft plastics known as Films (e.g. LDPE single use plastic bags, plastic bags, food wrappings etc.) were shredded. Metals were removed by magnetic and eddy-current separation. Denser-than water plastics (e.g. PVC, PET) were mostly removed by flotation over water. The shredded Film plastics were de-watered by centrifugation and densified by agglomeration/pelletization. Optionally, the agglomerates were extruded and passed through a screen filter to remove e.g. small pieces of aluminium foil and then the extrudate was chopped into pellets. The Film pellets/agglomerates were bagged in preparation for processing.

TABLE 2

SIMDIS boiling point data for Trial 2 Synthetic Crude Oil

| Wt % Off | BP ° C. |
|---|---|
| 0.5 | 44.2 |
| 1 | 62.4 |
| 2 | 79.4 |
| 3 | 95.6 |
| 4 | 104.0 |
| 5 | 110.8 |
| 6 | 117.6 |
| 7 | 124.4 |
| 8 | 128.0 |
| 9 | 133.2 |
| 10 | 133.2 |
| 11 | 135.6 |
| 12 | 135.6 |
| 13 | 138.2 |
| 14 | 140.8 |
| 15 | 143.4 |
| 16 | 146.0 |
| 17 | 150.8 |
| 18 | 153.0 |
| 19 | 155.0 |
| 20 | 162.6 |
| 21 | 167.0 |
| 22 | 174.2 |
| 23 | 176.6 |
| 24 | 178.8 |
| 25 | 183.8 |
| 26 | 189.8 |
| 27 | 193.8 |
| 28 | 198.0 |
| 29 | 199.6 |
| 30 | 203.4 |

TABLE 2-continued

SIMDIS boiling point data for Trial 2 Synthetic Crude Oil

| Wt % Off | BP ° C. |
|---|---|
| 31 | 209.2 |
| 32 | 215.8 |
| 33 | 219.2 |
| 34 | 223.0 |
| 35 | 228.6 |
| 36 | 234.0 |
| 37 | 237.2 |
| 38 | 238.8 |
| 39 | 242.4 |
| 40 | 248.0 |
| 41 | 254.4 |
| 42 | 257.4 |
| 43 | 263.6 |
| 44 | 270.0 |
| 45 | 274.0 |
| 46 | 277.4 |
| 47 | 283.0 |
| 48 | 289.0 |
| 49 | 291.8 |
| 50 | 299.2 |
| 51 | 304.8 |
| 52 | 307.8 |
| 53 | 313.0 |
| 54 | 318.2 |
| 55 | 321.6 |
| 56 | 329.6 |
| 57 | 334.0 |
| 58 | 340.0 |
| 59 | 345.6 |
| 60 | 348.8 |
| 61 | 356.4 |
| 62 | 360.6 |
| 63 | 367.2 |
| 64 | 371.6 |
| 65 | 376.8 |
| 66 | 383.2 |
| 67 | 388.8 |
| 68 | 394.2 |
| 69 | 399.4 |
| 70 | 405.2 |
| 71 | 411.6 |
| 72 | 416.0 |
| 73 | 422.8 |
| 74 | 428.4 |
| 75 | 434.6 |
| 76 | 440.8 |
| 77 | 447.0 |
| 78 | 453.6 |
| 79 | 460.4 |
| 80 | 468.0 |
| 81 | 474.6 |
| 82 | 482.2 |
| 83 | 489.4 |
| 84 | 497.6 |
| 85 | 505.2 |
| 86 | 513.8 |
| 87 | 522.4 |
| 88 | 531.4 |
| 89 | 541.4 |
| 90 | 551.8 |
| 91 | 563.0 |
| 92 | 575.0 |
| 93 | 589.0 |
| 94 | 604.8 |
| 95 | 624.2 |
| 96 | 648.8 |
| 97 | 686.0 |
| 97.6 | 719.6 |

TABLE 3

SIMDIS boiling point data for Trial 2 Synthetic Crude Oil

| Wt % Off | BP ° C. |
|---|---|
| 0.5 | 79.4 |
| 1 | 95.6 |
| 2 | 128.0 |
| 3 | 135.6 |
| 4 | 138.2 |
| 5 | 146.0 |
| 6 | 154.0 |
| 7 | 164.8 |
| 8 | 174.6 |
| 9 | 178.8 |
| 10 | 186.8 |
| 11 | 192.8 |
| 12 | 198.6 |
| 13 | 202.4 |
| 14 | 209.2 |
| 15 | 217.0 |
| 16 | 220.4 |
| 17 | 226.8 |
| 18 | 233.2 |
| 19 | 236.8 |
| 20 | 239.2 |
| 21 | 243.6 |
| 22 | 249.4 |
| 23 | 255.4 |
| 24 | 258.8 |
| 25 | 266.0 |
| 26 | 272.0 |
| 27 | 275.0 |
| 28 | 279.6 |
| 29 | 285.2 |
| 30 | 290.2 |
| 31 | 295.0 |
| 32 | 301.8 |
| 33 | 305.8 |
| 34 | 310.4 |
| 35 | 315.2 |
| 36 | 319.6 |
| 37 | 325.2 |
| 38 | 332.2 |
| 39 | 336.0 |
| 40 | 342.2 |
| 41 | 346.8 |
| 42 | 351.8 |
| 43 | 359.0 |
| 44 | 363.2 |
| 45 | 369.2 |
| 46 | 373.0 |
| 47 | 380.0 |
| 48 | 384.8 |
| 49 | 391.6 |
| 50 | 395.6 |
| 51 | 402.6 |
| 52 | 407.6 |
| 53 | 414.2 |
| 54 | 418.8 |
| 55 | 425.0 |
| 56 | 431.6 |
| 57 | 436.4 |
| 58 | 443.2 |
| 59 | 450.0 |
| 60 | 455.2 |
| 61 | 461.6 |
| 62 | 468.8 |
| 63 | 474.6 |
| 64 | 481.0 |
| 65 | 487.4 |
| 66 | 493.6 |
| 67 | 500.4 |
| 68 | 506.6 |
| 69 | 513.8 |
| 70 | 520.2 |
| 71 | 527.6 |
| 72 | 534.4 |
| 73 | 541.6 |
| 74 | 549.0 |

TABLE 3-continued

SIMDIS boiling point data for Trial 2 Synthetic Crude Oil

| Wt % Off | BP ° C. |
|---|---|
| 75 | 556.4 |
| 76 | 564.0 |
| 77 | 572.0 |
| 78 | 580.2 |
| 79 | 588.6 |
| 80 | 597.4 |
| 81 | 606.8 |
| 82 | 616.6 |
| 83 | 627.0 |
| 84 | 638.6 |
| 85 | 650.8 |
| 86 | 664.4 |
| 87 | 681.2 |
| 88 | 699.6 |
| 89 | 719.6 |

TABLE 4

SIMDIS boiling point data for Trial 3 Synthetic Crude Oil

| Wt % Off | BP ° C. |
|---|---|
| 0.5 | 103.2 |
| 1 | 120.2 |
| 2 | 128.2 |
| 3 | 132.4 |
| 4 | 138.6 |
| 5 | 149.2 |
| 6 | 160.8 |
| 7 | 172.4 |
| 8 | 183.2 |
| 9 | 192.8 |
| 10 | 201.8 |
| 11 | 213.0 |
| 12 | 221.6 |
| 13 | 228.6 |
| 14 | 233.0 |
| 15 | 238.0 |
| 16 | 245.0 |
| 17 | 251.4 |
| 18 | 258.6 |
| 19 | 265.6 |
| 20 | 269.6 |
| 21 | 275.0 |
| 22 | 281.6 |
| 23 | 286.0 |
| 24 | 293.8 |
| 25 | 299.8 |
| 26 | 304.4 |
| 27 | 309.6 |
| 28 | 314.0 |
| 29 | 320.6 |
| 30 | 327.6 |
| 31 | 333.0 |
| 32 | 339.2 |
| 33 | 343.4 |
| 34 | 351.4 |
| 35 | 356.4 |
| 36 | 363.0 |
| 37 | 367.2 |
| 38 | 374.6 |
| 39 | 380.0 |
| 40 | 387.0 |
| 41 | 391.4 |
| 42 | 398.8 |
| 43 | 404.8 |
| 44 | 410.0 |
| 45 | 416.4 |
| 46 | 422.2 |
| 47 | 428.8 |
| 48 | 434.2 |
| 49 | 440.2 |
| 50 | 446.8 |
| 51 | 452.4 |
| 52 | 458.6 |
| 53 | 464.6 |
| 54 | 470.6 |
| 55 | 476.6 |
| 56 | 482.0 |
| 57 | 487.4 |
| 58 | 493.8 |
| 59 | 499.4 |
| 60 | 505.2 |
| 61 | 510.6 |
| 62 | 515.8 |
| 63 | 521.6 |
| 64 | 526.8 |
| 65 | 532.2 |
| 66 | 537.6 |
| 67 | 543.2 |
| 68 | 548.6 |
| 69 | 554.0 |
| 70 | 559.4 |
| 71 | 564.8 |
| 72 | 570.0 |
| 73 | 575.8 |
| 74 | 581.0 |
| 75 | 586.8 |
| 76 | 592.4 |
| 77 | 597.8 |
| 78 | 603.8 |
| 79 | 609.6 |
| 80 | 615.4 |
| 81 | 621.4 |
| 82 | 627.4 |
| 83 | 633.6 |
| 84 | 639.8 |
| 85 | 646.2 |
| 86 | 652.6 |
| 87 | 659.4 |
| 88 | 666.4 |
| 89 | 674.0 |
| 90 | 682.0 |
| 91 | 690.2 |
| 92 | 698.0 |
| 93 | 705.6 |
| 94 | 713.8 |
| 94.7 | 719.6 |

Example Two

The results presented in this Example demonstrates the importance of the use of static mixers to provide good mixing between the molten polymer extrudate and the supercritical aqueous solvent. This is important to obtain good heat transfer from the supercritical aqueous solvent, which is at a higher temperature than the polymer melt, and also to intimately mix the solvent and the polymeric material, thereby enabling the solvent to influence the reaction pathways of the polymeric material during polymerization, including enabling hydrogen transfer from solvent to depolymerization products. Mixing profiles for two different scenarios (Iteration 1: FIGS. 13-15; Iteration 2: FIGS. 16-17) were examined by computational fluid dynamics (CFD) modelling. The supercritical aqueous solvent was modelled as supercritical water (SCW) at 500° C. Other modelling parameters were as follows:

Molten Plastic Inlet:

Mass flow rate: 2782 kg/h, Temperature: 350° C.

SCW Inlet:

Mass flow rate across four inlets: 1762 kg/h, Temperature: 500° C.

Pipe Walls:

Adiabatic.

Tables 5, 6 and 7: Fluid Properties Employed in the Modelling

TABLE 5

| Plastics Properties | | | | | | |
|---|---|---|---|---|---|---|
| 16 Temperature ° C. | 325 | 350 | 375 | 400 | 425 | 450 |
| 17 Shear Rate 1/s | 10 | 10 | 10 | 10 | 10 | 10 |
| 18 Viscosity Pa · s | 331 | 270 | 224 | 189 | 161 | 139 |
| 19 Density kg/m$^3$ | 685 | 670 | 655 | 640 | 625 | 610 |
| 20 Enthalpy kJ/kg | 1019 | 1109 | 1201 | 1295 | 1391 | 1488 |
| Supercritical steam/ water properties @300 bar | | | | | | |
| 21 Temperature ° C. | 350 | 375 | 400 | 425 | 450 | 500 |
| 22 Viscosity Pa · s | 7.55E−05 | 6.45E−05 | 4.39E−05 | 3.19E−05 | 3.09E−05 | 0.000032 |
| 23 Density kg/m$^3$ | 644 | 558 | 357 | 189 | 148 | 115 |
| 24 Enthalpy kJ/kg | 1609 | 1792 | 2153 | 2612 | 2821 | 3085 |

TABLE 6

| Plastics Properties | | | | | |
|---|---|---|---|---|---|
| Temperature (deg C.) | 350 | 375 | 400 | 425 | 450 |
| Thermal conductivity (W/m · K) | 0.138 | 0.1355 | 0.133 | 0.1305 | 0.128 |

TABLE 7

| SCW @ 300 bar | | | | | |
|---|---|---|---|---|---|
| Temperature (deg C.) | 350 | 375 | 400 | 425 | 450 |
| Thermal conductivity (W/m · K) | 0.49597 | 0.43807 | 0.33204 | 0.17582 | 0.13616 |

Iteration 1 (FIGS. 13-15) modelled a 6 inch diameter pipe with four radial 10 mm diameter SCW inlets in a single plane, the iteration was modelled with 0, 2 and 4 static mixer elements.

Iteration 2 (FIGS. 16-18) modelled a 6 inch pipe with four 10 mm diameter SCW inlets in two planes 50 mm apart and triangular bars just upstream of the SCW inlets, the iteration was modelled with 0, 2 and 4 static mixer elements.

The geometry of the static mixer elements modelled as part of the assembly was a design provided by NOV, Process and Flow Technologies, Mixing Technologies, 5870 Poe Ave, Dayton, Ohio 45414.

The finding of the modelling was that the static mixers enhance the mixing of the SCW and the polymer melt. The mixing uniformity at a distance of approximately 9 pipe diameters from the SCW injection point is shown in FIG. 19. The mixing uniformity also represents better heat transfer from the SCW to the polymeric material.

The pressure drop introduced by the static mixer elements is approximately 2.5 bar per element, according to the modelling. This pressure drop is operationally manageable for up to about four mixers (10 bar).

The performance of the mixer configuration is illustrated in the attached charts. The first, FIG. 20 shows that with no mixer that there is poor mixing of the supercritical water with the polymeric material, with two phase flow occurring over the pipe length.

Running the computational fluid dynamic modelling (CFD modelling) for the various mixer designs has shown the benefit of including a supercritical fluid distributor with a standard industrial mixer design in achieving good mixing as illustrated in the results shown in FIG. 21.

The good mixing is reflected in the temperature profiles of the polymeric material, showing how the cool (blue) fluid is heated and how the supercritical fluid (red) temperature is cooled arriving quickly at a uniform mixed temperature (FIG. 22).

Example Three

The results presented in this example demonstrates that the methods of the present invention enable facile separation of the supercritical aqueous solvent from the depolymerization product without the need, for example, de-emulsifying chemicals or enhanced gravity methods such as centrifuges/decanters.

The behaviour of a flash depressurization coupled to a fractionating column was demonstrated as follows. Post-consumer plastics of two broad types were prepared for extrusion. Hard plastics from post-consumer collection known as PTT (Pots, Tubs and Trays, e.g. food containers, personal hygiene product containers, toys, laundry baskets, milk carton crates) were chipped or shredded into approximately 1-20 mm sizes. Metals were removed by magnetic and eddy-current separation. Denser-than water plastics (e.g. PVC, PET) were removed by flotation over water. The chipped PTT plastics were de-watered by centrifugation and bagged in preparation for extrusion. Soft plastics known as Films (e.g. LDPE single use plastic bags, plastic bags, food wrappings etc.) were shredded. Metals were removed by magnetic and eddy-current separation. Denser-than water plastics (e.g. PVC, PET) were removed by flotation over water. The shredded Film plastics were de-watered by centrifugation and densified by agglomeration/pelletization. Optionally, the agglomerates were extruded and passed through a screen filter to remove e.g. small pieces of aluminium foil and then the extrudate was chopped into pellets. The Film pellets/agglomerates were bagged in preparation for processing.

The PTT and Film materials were mixed in 3:1 proportion by mass and depolymerized in a continuous flow reactor consisting of, in series, an extruder, a supercritical water injection zone, a series of heaters, three or four reactors, a cooler, a depressurization stage, and one or more product tanks. The depolymerization products was a synthetic crude oil, waxy in nature and containing approximately 30% of its mass as entrained water. The entrained water could not be physically separated at temperatures below 95° C. from waxy synthetic crude oil by simple means such as decantation, since no visible separation of the oil and water was observed.

The product fractionation method of the present invention was simulated by atmospheric distillation of the low-boiling fractions of the synthetic crude oil. The low boiling fractions, or naphtha (approximately 40-210° C. boiling point) of the crude and the water from the aqueous solvent co-distilled and were condensed together. The water and the naphtha spontaneously phase separated (FIG. 9), having low mutual solubility, and could readily be separated at ambient temperature by means known in the art such as decantation or by means of a simple valved outlet.

Analysis of the water phase showed that it had low organic content and low metals content, and as such could be readily recycled or treated for discharge or re-use.

TABLE 8

Composition of aqueous phase in contact with Naphtha. Sample diluted 3-fold with pure water prior to analysis.

| VOCS in Water Method: AN433 Tested: 8 Mar. 2019 | | | |
|---|---|---|---|
| Fumigants | | | |
| 2,2-dichloropropane | µg/L | 0.5 | — |
| 1,2-dichloropropane | µg/L | 0.5 | — |
| cis 1,3-dichloropropene | µg/L | 0.5 | — |
| trans 1,3-dichloropropene | µg/L | 0.5 | — |
| 1,2-dibromoethane (EDB) | µg/L | 0.5 | — |
| Halogenated Aliphatics | | | |
| Dichlorodifluoromethane (CFC-12) | µg/L | 5 | — |
| Chloromethane | µg/L | 5 | — |
| Vinyl chloride (Chloroethane) | µg/L | 0.3 | — |
| Bromomethane | µg/L | 10 | — |
| Chloroethane | µg/L | 5 | — |
| Trichlorofluoromethane | µg/L | 1 | — |
| Iodomethane | µg/L | 5 | — |
| 1,1-dichloroethene | µg/L | 0.5 | — |
| Dichloromethane (Methylene chloride) | µg/L | 5 | — |
| Allyl chloride | µg/L | 2 | — |
| trans-1,2-dichloroethene | µg/L | 0.5 | — |
| 1,1-dichloroethane | µg/L | 0.5 | — |
| cis-1,2-dichloroethene | µg/L | 0.5 | — |
| Bromochloromethane | µg/L | 0.5 | — |
| 1,2-dichloroethane | µg/L | 0.5 | — |
| 1,1,1-trichloroethane | µg/L | 0.5 | — |
| 1,1-dichloropropene | µg/L | 0.5 | — |
| Carbon tetrachloride | µg/L | 0.5 | — |
| Dibromomethane | µg/L | 0.5 | — |
| Trichloroethane (Trichloroethylene, TCE) | µg/L | 0.5 | — |
| 1,1,2-trichloroethane | µg/L | 0.5 | — |
| 1,3-dichloropropane | µg/L | 0.5 | — |
| Tetrachloroethene (Perchloroethylene, PCE) | µg/L | 0.5 | — |
| 1,1,1,2-tetrachloroethane | µg/L | 0.5 | — |
| sis-1,4-dichloro-2-butene | µg/L | 1 | — |
| 1,1,2,2-tetrachlorethane | µg/L | 0.5 | — |
| 1,2,3-trichloropropane | µg/L | 0.5 | — |
| trans-1,4-dichloro-2-butene | µg/L | 1 | — |
| 1,2-dibromo-3-chloropropane | µg/L | 0.5 | — |
| Hexachlorobutadiene | µg/L | 0.5 | — |
| Halogenated Aromatics | | | |
| Chlorobenzene | µg/L | 0.5 | — |
| Bromobenzene | µg/L | 0.5 | — |
| 2-chlorotoluene | µg/L | 0.5 | — |

TABLE 8-continued

Composition of aqueous phase in contact with Naphtha. Sample diluted 3-fold with pure water prior to analysis.

| | | | |
|---|---|---|---|
| 4-chlorotoluene | µg/L | 0.5 | — |
| 1,3-dichlorobenzene | µg/L | 0.5 | — |
| 1,4-dichlorobenzene | µg/L | 0.3 | — |
| 1,2-dichlorobenzene | µg/L | 0.5 | — |
| 1,2,4-trichlorobenzene | µg/L | 0.5 | — |
| 1,2,3-trichlorobenzene | µg/L | 0.5 | — |
| Monocyclic Aromatic Hydrocarbons | | | |
| Benzene | µg/L | 0.5 | — |
| Toluene | µg/L | 0.5 | — |
| Ethylbenzene | µg/L | 0.5 | — |
| m/p-xylene | µg/L | 1 | — |
| o-xylene | µg/L | 0.5 | — |
| Styrene (Vinyl benzene) | µg/L | 0.5 | — |
| Isopropylbenzene (Cumene) | µg/L | 0.5 | — |
| n-propylbenzene | µg/L | 0.5 | — |
| 1,3,5-trimethylbenzene | µg/L | 0.5 | — |
| tert-butylbenzene | µg/L | 0.5 | — |
| 1,2,4-trimethylbenzene | µg/L | 0.5 | — |
| sec-butylbenzene | µg/L | 0.5 | — |
| p-isopropyltoluene | µg/L | 0.5 | — |
| n-butylbenzene | µg/L | 0.5 | — |
| Nitrogenous Compounds | | | |
| Acrylonitrile | µg/L | 0.5 | — |
| 2-nitropropane | µg/L | 100 | <1000 † |
| Oxygenated Compounds | | | |
| Acetone (2-propanone) | µg/L | 10 | 150000 |
| MtBE (Methyl-tert-butyl ether) | µg/L | 2 | — |
| Vinyl acetate | µg/L | 10 | — |
| MEK (2-butanone) | µg/L | 10 | — |
| MIBK (4-methyl-2-pentanone) | µg/L | 5 | — |
| 2-hexanone (MBK) | µg/L | 5 | — |
| Polycyclic VOCs | | | |
| Naphthalene | µg/L | 0.5 | — |
| Sulphonated Compounds | | | |
| Carbon disulfide | µg/L | 2 | — |
| Surrogates | | | |
| Dibromofluoromethane (Surrogate) | % | — | — |
| d4-1,2-dichloroethane (Surrogate) | % | — | — |
| d8-toluene (Surrogate) | % | — | — |
| Bromofluorobenzene (Surrogate) | % | — | — |
| Totals | | | |
| Total Xylenes | µg/L | 1.5 | 1900 |
| Total BTEX | µg/L | 3 | 5600 |
| Total VOC | µg/L | 10 | 160000 |
| Trihalomethanes | | | |
| Chloroform (THM) | µg/L | 0.5 | — |
| Bromodichloromethane (THM) | µg/L | 0.5 | — |
| Dibromochloromethane (THM) | µg/L | 0.5 | — |
| Bromoform (THM) | µg/L | 0.5 | — |
| Volatile Petroleum Hydrocarbons in Water Method: AN433 Tested 8 Mar. 2019 | | | |
| TRH C6-C10 | µg/L | 50 | NVL |
| Surrogates | | | |
| Dibromofluoromethane (Surrogate) | % | — | — |
| d4-1,2-dichloroethane (Surrogate) | % | — | — |
| d8-toluene (Surrogate) | % | — | — |
| Bromofluorobenzene (Surrogate) | % | — | — |
| VPH F Bands | | | |
| Benzene (F0) | µg/L | 0.5 | — |
| TRH C6-C10 minus BTEX (F1) | µg/L | 50 | NVL |
| TRH (Total Revoverable Hydrocarbons) in Water Method: AN403 | | | |

TABLE 8-continued

Composition of aqueous phase in contact with Naphtha. Sample diluted 3-fold with pure water prior to analysis.

Tested: 11 Mar. 2019

| | | | |
|---|---|---|---|
| TRH C10-C14 | µg/L | 50 | 57000 |
| TRH C15-C28 | µg/L | 200 | 7200 |
| TRH C29-C36 | µg/L | 200 | 2600 |
| TRH C37-C40 | µg/L | 200 | 830 |
| TRH C10-C36 | µg/L | 450 | 66000 |
| TRH C10-C40 | µg/L | 650 | 67000 |
| TRH F Bands | | | |
| TRH > C10-C16 | µg/L | 60 | 46000 |
| TRH > C10-C16 - Naphthalene (F2) | µg/L | 60 | 46000 |
| TRH > C16-C34 (F3) | µg/L | 500 | 7900 |
| TRH > C34-C40 (F4) | µg/L | 500 | 1800 |

Total Phenolics in Water Method: AN289 Tested 8 Mar. 2019

| | | | |
|---|---|---|---|
| Total Phenols | mg/L | 0.01 | 40 |

COD in Water Method: AN179/AN181 Tested: 11 Mar. 2019

| | | | |
|---|---|---|---|
| Chemical Oxygen Demand | mg/L | 10 | 6400 | pH in Water Method: AN101 Tested: 12 Mar. 2019

| | | | |
|---|---|---|---|
| pH** | No unit | — | 3.5 |

Oil and Grease in Water Method: AN185 Tested 12 Mar. 2019

| | | | |
|---|---|---|---|
| Oil and Grease | mg/L | 5 | <5 |

Total and Volatile Suspended Solids (TSS/VSS) Method AN114 Tested 12 Mar. 2019

| | | | |
|---|---|---|---|
| Total suspended solids Dried at 103-105° C. | mg/L | 5 | <5 |

BOD5 Method: AN183 Tested: 8 Mar. 2019

| | | | |
|---|---|---|---|
| Bichemical Oxygen Demand (BOD5) | mg/L | 5 | NVL |

Forms of Carbon Method: AN190 tested: 11 Mar. 2019

| | | | |
|---|---|---|---|
| Total Organic Carbon as NPOC | mg/L | 0.2 | 2000 |

Ammonia Nitrogen by Discrete Analyser (Aquakem) Method: AN291 tested: 8 Mar. 2019

| | | | |
|---|---|---|---|
| Ammonia Nitrogen, $NH_3$ as N | mg/L | 0.01 | 1.4 |

Free Cyanide in Water Method: AN076/AN287 Tested: -

| | | | |
|---|---|---|---|
| Free Cyanide | mg/L | 0.004 | NVL |

Anions by Ion Chromatography in Water Method: AN245 Tested: 8 Mar. 2019

| | | | |
|---|---|---|---|
| Nitrate Nitrogen NO3—N | mg/L | 0.005 | <0.005 |

Nitrite in Water Method: AN277 Tested: 8 Mar. 2019

| | | | |
|---|---|---|---|
| Nitrite Nitrogen, NO2 as N | mg/L | 0.005 | <0.005 |
| Total Oxidised Nitrogen, NOx—N | mg/L | 0.005 | <0.005 |

TKN Kjeldahl Digestion by Discrete Analyser Method: AN281/AN292 (Sydney only) Tested: 13 Mar. 2019

| | | | |
|---|---|---|---|
| Total Kjeldahl Nitrogen | mg/L | 0.05 | NVL |
| Total Nitrogen (calc) | mg/L | 0.05 | NVL |

TABLE 8-continued

Composition of aqueous phase in contact with Naphtha. Sample diluted 3-fold with pure water prior to analysis.

Total Phosphorous by Kjeldahl Digestion DA in Water Method: AN279/293 (Sydney only) Tested: 13 Mar. 2019

| | | | |
|---|---|---|---|
| Total Phosphorous (Kjeldahl Digestion) as P | mg/L | 0.02 | NVL |

Metals in Water (Dissolved) by ICPOES Method: AN230 Tested: 11 Mar. 2019

| | | | |
|---|---|---|---|
| Tin, Sn | mg/L | 0.05 | <0.05 |

Trace Metals (Dissolved) in Water by ICPMS Method: AN318 Tested: 8 Mar. 2019

| | | | |
|---|---|---|---|
| Aluminium, Al | µg/L | 5 | 7 |
| Antimony, Sb | µg/L | 1 | <1 |
| Arsenic, As | µg/L | 1 | 3 |
| Cadmium, Cd | µg/L | 0.1 | 0.2 |
| Chromium, Cr | µg/L | 1 | 22 |
| Cobalt, Co | µg/L | 1 | <1 |
| Copper, Cu | µg/L | 1 | 3 |
| Iron, Fe | µg/L | 5 | 160 |
| Lead, Pb | µg/L | 1 | <1 |
| Manganese, Mn | µg/L | 1 | 6 |
| Molybdenum, Mo | µg/L | 1 | <1 |
| Nickel, Ni | µg/L | 1 | 20 |
| Selenium, Se | µg/L | 1 | 29 |
| Silver, Ag | µg/L | 1 | <1 |
| Tin, Sn* | µg/L | 1 | <1 |
| Tungsten, W* | µg/L | 1 | <1 |
| Vanadium, V | µg/L | 1 | <1 |
| Zinc, Zn | µg/L | 5 | 10 |

Mercury (dissolved) in Water Method: AN311(Perth)/AN312 tested: 13 Mar. 2019

| | | | |
|---|---|---|---|
| Mercury | mg/L | 0.0001 | <0.0001 |

Alcohols in Water Method: AN478 tested: 12 Mar. 2019

| | | | |
|---|---|---|---|
| 1-butanol* | mg/L | 1 | 1800 |
| 1-hexanol* | mg/L | 1 | <1 |
| 1-butoxy-2-propanol* | mg/L | 1 | <1 |
| 1-propanol* | mg/L | 1 | 30 |
| 2-butoxyethanol* | mg/L | 0.02 | <0.02 |
| 2-ethyl hexanol* | mg/L | 1 | <1 |
| ethanol* | mg/L | 1 | 130 |
| isobutanol* | mg/L | 1 | <1 |
| isopropanol* | mg/L | 1 | 95 |
| methanol* | mg/L | 1 | 400 |

By comparison, to remove the aqueous solvent (water) from the waxy synthetic crude oil it was necessary to add a chemical emulsion breaker (PROSOLV AI8565 by SUEZ) at levels of around 1000 ppm and centrifuge at elevated temperature (approximately 90° C.).

Example Four

The chemical composition of depolymerization products from post-consumer polymeric material processed according to the methods of the invention is detailed in Table 9 below.

TABLE 9 chemical composition of depolymerization products from post-consumer polymeric material. Compositions in mass %

| Feedstock | Naphtha Composition IBP – 210° C. AEPB | Gas Oil Composition 210° C. – 360° C. AEBP | VGO composition 360° C. – 550° C. AEBP | Vac residue composition > 550° C. AEBP |
|---|---|---|---|---|
| Post-consumer rigid plastics containing PE, PP (major components) PET, polyamide, ABS, | n-Paraffins 16% Iso-paraffins 26.7%, Olefins 11.9%, napthenes 16.8%, | n-Paraffins 21% Iso-paraffins 18%, Olefins and napthenes 39%, | Saturates 79 of which n-paraffins 24.5%, Aromatics 21% | % H 13.03 % C 85.80 |

TABLE 9-continued chemical composition of depolymerization products from post-consumer polymeric material. Compositions in mass %

| Feedstock | Naphtha Composition IBP – 210° C. AEPB | Gas Oil Composition 210° C. – 360° C. AEBP | VGO composition 360° C. – 550° C. AEBP | Vac residue composition > 550° C. AEBP |
|---|---|---|---|---|
| polycarbonate, PS, EPDM, PVC, polyurethane, PMMA (minor components) AND post-consumer film plastics containing same components, in proportion 2:1 rigid: film by mass | aromatics 17.3%, unknown/polar 11.1% % H 13.6 mass % C 84.95 mass | aromatics and polars 22% % H 13.4 % C 86.66 | % H 13.56 % C 86.54 | |

Example Five

The results presented in this example demonstrate the principle of blow down of solid material from the reactors.

Post-consumer plastics of two broad types were prepared for extrusion. Hard plastics from post-consumer collection known as PTT (Pots, Tubs and Trays, e.g. food containers, personal hygiene product containers, toys, laundry baskets, milk carton crates) were chipped or shredded into approximately 1-20 mm sizes. Metals were removed by magnetic and eddy-current separation. Denser-than water plastics (e.g. PVC, PET) were removed by flotation over water. The chipped PTT plastics were de-watered by centrifugation and bagged in preparation for extrusion. Soft plastics known as Films (e.g. LDPE single use plastic bags, plastic bags, food wrappings etc.) were shredded. Metals were removed by magnetic and eddy-current separation. Denser-than water plastics (e.g. PVC, PET) were removed by flotation over water. The shredded Film plastics were de-watered by centrifugation and densified by agglomeration/pelletization. Optionally, the agglomerates were extruded and passed through a screen filter to remove e.g. small pieces of aluminium foil and then the extrudate was chopped into pellets. The Film pellets/agglomerates were bagged in preparation for processing.

The PTT and Film materials were mixed in various proportions and depolymerized in a continuous flow reactor consisting of, in series, an extruder, a supercritical water injection zone, a series of heaters, three horizontally oriented reactors tubes arranged in series, a cooler, a depressurization stage, and one or more product tanks. Examples of typical experimental conditions are given in Table 10. The depolymerization products were synthetic crude oils.

TABLE 10

Typical Experimental Conditions

| Example No. | Proportion of PTT in Polymer feed | Proportion of Film in Polymer Feed | Polymer/water mass ratio | Reaction Temperature ° C. | Reaction Pressure Bar | Extruder Outlet Temperature ° C. | Supercritical Water Temperature at Mixing Zone ° C. |
|---|---|---|---|---|---|---|---|
| 1 | 1 | 1 | 48/51 | 440 | 220 | 350 | 510 |
| 2 | 2 | 1 | 68/32 | 440 | 220 | 350 | 510 |
| 3 | 3 | 1 | 65/35 | 435 | 220 | 350 | 500 |

After the experiment(s) the horizontal tubular reactors were opened and inspected and found to contain residual solid material that had precipitated from the fluid phases during the course of the experiment and accumulated by gravitational sedimentation in the bottom of the reactor tubes. The solids were analysed and found to have the following compositions shown in Table 11.

TABLE 11

Solids composition data

| | Mass HRA solids collected (kg) | Moisture content wt % | Ash Content (db) wt % | Toluene extractable wt % (db) |
|---|---|---|---|---|
| Reactor 1 of 3 | 10.2 (w) | 47.5 | 70.1 | 24.0 |
| Reactor 2 of 3 | 8.64 (w) | 45.9 | 74.0 | 17.6 |

The analysis showed that the solids were largely inorganic ash with a small component of toluene-soluble heavy wax also present (Table 12). Reactor samples 1 and 2 of Table 11 correspond to Analysis No. 1 and 2 in Table 12.

TABLE 12

Major Ash compositional analysis results

| Analysis No. | % Oxide in Ash (db) | | | | | | | | |
|---|---|---|---|---|---|---|---|---|---|
| | $SiO_2$ | $Al_2O_3$ | $Fe_2O_3$ | $TiO_2$ | $K_2O$ | MgO | $Na_2O$ | CaO | $SO_3$ |
| 1 | 8.1 | 3.6 | 21.9 | 9.7 | 0.09 | 1.0 | 0.1 | 31.9 | 3.9 |
| 2 | 4.2 | 2.1 | 31.6 | 15.3 | 0.03 | 0.7 | 0.1 | 22.4 | 6.4 |
| 3 | 21.9 | 18.8 | 4.4 | 13.1 | 0.25 | 5.2 | 0.5 | 19.0 | 0.6 |
| 4 | 14.7 | 4.2 | 4.4 | 47.3 | 0.24 | 3.3 | 0.9 | 17.6 | 0.8 |
| 5 | 21.0 | 17.9 | 4.2 | 11.9 | 0.23 | 4.9 | 0.5 | 17.5 | 0.3 |
| 6 | 16.4 | 11.2 | 4.1 | 16.2 | 0.11 | 4.4 | 0.2 | 24.0 | 0.9 |
| 7 | 17.2 | 9.2 | 3.7 | 19.3 | 0.15 | 5.4 | 0.2 | 23.3 | 0.9 |

| | % Oxide in Ash (db) | | | | | | | | |
|---|---|---|---|---|---|---|---|---|---|
| | $P_2O_5$ | BaO | SrO | CuO | MnO | $Cr_2O_3$ | ZnO | $V_2O_5$ | $Co_3O_4$ | NiO |
| 1 | 0.45 | 0.33 | 1.0 | 0.06 | 0.06 | 0.7 | 2.4 | <0.01 | 0.02 | 0.01 |
| 2 | 0.48 | 0.26 | 1.7 | 0.06 | 0.06 | 1.0 | 3.5 | <0.01 | 0.02 | 0.01 |
| 5 | 0.67 | 0.6 | 0.04 | 0.33 | 0.11 | 0.30 | 0.34 | 0.01 | 0.02 | 0.06 |
| 6 | 0.48 | 0.41 | 0.03 | 0.10 | 0.09 | 0.21 | 0.48 | <0.01 | 0.02 | 0.08 |
| 7 | 0.55 | 0.63 | 0.03 | 0.09 | 0.08 | 0.38 | 0.58 | <0.01 | 0.03 | 0.04 |

TABLE 13

Trace metal analysis results on the HRA ash material

| | Element in sample ppm (db) | | | | | | | | | |
|---|---|---|---|---|---|---|---|---|---|---|
| | Ag | As | Ba | Be | Bi | Cd | Co | Cr | Cu | Mn |
| 3 | 7 | 10 | 2600 | <1 | <1 | 270 | 13 | 900 | 800 | 400 |
| 4 | <1 | 3 | 14200 | 1 | 210 | 40 | 20 | 885 | 350 | 265 |

| | Element in sample ppm (db) | | | | | | | | |
|---|---|---|---|---|---|---|---|---|---|
| | Mo | Ni | P | Pb | Sn | Ti | V | Zn | Zr | Hg |
| 3 | 28 | 250 | 1500 | 1850 | 95 | 37 | 18 | 1120 | 570 | 0.35 |
| 4 | 25 | 285 | 2620 | 140 | 1060 | 230 | 30 | 10500 | 1080 | — |

Elemental analysis showed that the ash (Table 13) was largely composed of metals such as Si, Ti, Fe, Ca, Al typically found as e.g. fillers, additives, opacifiers, modifiers etc. in plastics formulations, demonstrating that these had deposited from the plastic during polymerization, being insoluble in the supercritical phase(s).

Example Six

The results presented in this example demonstrate the addition of a flash depressurization from the full reaction temperature or within 50 degrees of the full reaction temperature, and the full reaction pressure, to slightly above atmospheric pressure.

The experimental configuration used is shown in FIG. 23. Post-industrial and post-consumer plastics comprising polyethylene from off-specification condiment bottles (about 68%), paper pellets (about 20%) recycled PET (about 10%) and discarded neoprene wetsuits (about 2%) were prepared for extrusion. The mixed feedstock was depolymerized in a continuous flow reactor consisting of, in series, an extruder, a supercritical water injection zone, a series of heaters, three or four reactors, a depressurization stage, and one or more product tanks. One product tank fitted with a reflux condenser was used as a flash vessel. The product stream was depressurized through a capillary pipe into said flash vessel at a temperature of about 420° C. and a pressure of about 240 bar. The end of the capillary was optionally submerged under water present initially in the flash vessel and optionally cooled by means of an external water jacket surrounding the flash vessel. Optionally and alternatively the capillary outlet was not submerged in water. The outlet of the flash vessel was at near-atmospheric pressure (e.g. 1 bar of 1.1 bar or 1.2 bar absolute), volatile products passing through a reflux condenser and then to a flare where they were combusted.

Product hydrocarbons were collected into the flash vessel as a waxy synthetic crude oil product mixed with water. No deposits of terephthalic acid or other insoluble materials from hydrolysis of PET were found on the condenser or elsewhere in the depressurization/product collection system.

Example Seven

As for Example 6 but with a feedstock composition of off-specification condiment bottles (about 80%) and recycled PET (about 20%) and the end of the pressure let-down capillary was directed vertically downwards a few centimetres above the surface of a small amount of water in the flash vessel. In this case white deposits of terephthalic acid and other PET hydrolysis products were detected on the upper surfaces of the flash vessel.

Example Eight

PET (20% by weight) in pellet form was mixed with waste PE pellets (80% by weight). The mixture was fed into a single screw extruder fitted with electrical heating elements where the polymer mixture was pressurized to approximately 240 bar and heated to approximately 330-340° C. by the point of the extruder exit. The extrudate was fed under pressure to a mixing zone where it was mixed (contacted) with supercritical water at approximately 490° C. and 240 bar. The fluid mixture was then raised to reaction temperature of 440-450° C. by three trimmer heaters in series. The fluid then passed to three 30 litre 310 stainless steel tubular reactors arranged horizontally in series, the reactor zone was maintained at the reaction temperature by means of a gas blown box enclosure. During residence in the reactor zone the polymer mixture was depolymerized to form an oil product. The polymer mass flow rate was 33 kg/h and the supercritical water mass flow rate was 27 kg/h, the total mass flow rate was 60 kg/h and the plastic to water mass ratio was about 55:45.

The hot fluid was then depressurized at a temperature of 400-440° C. and 240 bar to a first flash vessel at slightly more than atmospheric pressure. The flash vessel was connected to a second vessel for the collection of condensate. The temperature of the flash vessel was observed to rise to about 70° C. initially and then to decrease to 21° C. during the duration of the experiment, approximately 165 minutes. Gas and vapour passing the condensate vessel were cooled and metered by means of a rotary volume flow meter. In this way the product fluids exiting the reactor were fractionated to a heavy, viscous, waxy hydrocarbon oil fraction, retained in the flash vessel; a light hydrocarbon oil, of low viscosity and less dense than water, plus water, retained in the condensate vessel, and a gas-vapour fraction. The gas-vapour fraction was further passed to a second condenser/fractionation vessel stage where a small amount (1.1 kg) of naphtha and water was condensed and separated. The composition of the gas/vapour passing the second condenser stage was analysed off-line by GC from a grab sample. The flash vessel contained about 20 kg of water and 53.5 kg of heavy oil and the condensate tank about 54 kg of water and 12.5 kg of light oil after the run. The light oil in the condensate tank easily separated from the water under gravity. About 11.1 kg of gas and condensate was estimated to have been produced in the corresponding period, based on an estimated density for the mixed gases and vapours based on composition.

The pressure-let-down and fractionation system used is diagrammatically illustrated in FIG. 24.

Vacuum distillation of the heavy waxy oil retained in the flash vessel showed an initial boiling point of 115° C. at 10 torr pressure or approximately 240° C. AEBP, indicating that the naphtha boiling range part of the product had effectively been fractionated to the condensate vessel. Thermogravimetric analysis (TGA) of the total syncrude (condensate and flash vessel heavy waxy oil samples recombined pro-rata) is shown in FIG. 25 and is consistent with the distillation analysis of the heavy waxy oil.

A compositional analysis of the gas-vapour phase is shown in Table 14.

TABLE 14

| Composition of gas-vapour product | | |
|---|---|---|
| Component | Unit | Value |
| Hydrogen | % vol | 5.4 |
| Carbon dioxide | % vol | 17.4 |
| Carbon Monoxide | % vol | 7.8 |
| Methane | % vol | 19.5 |
| Ethene | % vol | 1.4 |
| Ethane | % vol | 15.4 |
| Propene | % vol | 3.8 |
| Propane | % vol | 13.3 |
| Butenes | % vol | 3.1 |
| Iso-butane | % vol | 0.4 |
| n-butane | % vol | 6.7 |
| Pentanes | % vol | 3.8 |
| Hexanes | % vol | 1.5 |
| Heptanes | % vol | 0.3 |
| Benzene | Ppm v/v | 1740 |
| Toluene | Ppm v/v | 410 |
| ethylbenzene | Ppm v/v | 8.4 |

TABLE 14-continued

| Composition of gas-vapour product | | |
|---|---|---|
| Component | Unit | Value |
| Xylene m-, p- | Ppm v/v | 9.2 |
| o-xylene | Ppm v/v | 4.7 |
| Trimethylbezene | Ppm v/v | 4.8 |
| Naphthalene | Ppm v/v | 0.4 |

Example Nine

Radiata pine Wood was mixed with polypropylene pellets (PP) and the mixture was pelletized to form mixed wood-PP pellets. The composition of the feed mixture was: 29 wt. % dry basis wood flour, 2 wt. % water associated with the wood flour, and 69 wt. % polypropylene dry basis. The mixture was fed into a single screw extruder fitted with electrical heating elements where the mixture was pressurized to approximately 230-240 bar and heated to approximately 315° C. by the point of the extruder exit. The extrudate was fed under pressure to a mixing zone where it was mixed (contacted) with supercritical water at approximately 440° C. and 240 bar. The fluid mixture thereby attained the target reaction temperature of about 390-400° C. The fluid then passed to two 30 litre 310 stainless steel tubular reactors arranged horizontally in series, the reactor zone was maintained at the reaction temperature by means of a gas blown box enclosure. During residence in the reactor zone the feedstock mixture was depolymerized to form an oil product. The feedstock extrudate mass flow rate was 29 to 32 kg/h and the supercritical water mass flow rate was 34 kg/h, the total mass flow rate was 63-66 kg/h.

The hot fluid was then depressurized at a temperature of 380-400° C. and 240 bar to a first flash vessel at slightly more than atmospheric pressure. The flash vessel was connected to a second vessel for the collection of condensate. The arrangement is partly shown in FIG. 26. The first flash vessel is labelled MBT. Gas and vapour passing the condensate vessel were cooled and metered by means of a rotary volume flow meter. In this way the product fluids exiting the reactor were fractionated to a heavy, viscous, waxy hydrocarbon oil fraction, retained in the flash vessel; a light hydrocarbon oil, of low viscosity and less dense than water, plus water, retained in the condensate vessel, and a gas-vapour fraction (labelled NCG in FIG. 26). The gas-vapour fraction was further passed to a second condenser stage where a small amount of naphtha and water was condensed. The composition of the gas/vapour passing the second condenser stage was analysed by GC from a grab sample.

Example Ten

Recycled polyethylene (PE) pellets were extruded at 15 kg/h and 275° C., 240-260 bar at the extruder exit into a continuous flow hydrothermal reactor where the extrudate was contacted with supercritical water at a flow rate of 22.5 kg/h and 420° C., 240-260 bar in a mixing zone in which was situated a helical static mixer element which provided good mixing of the SCW and molten PE, thereby enabling cracking reactions to occur efficiently in the subsequent stages of the process. The temperature of the fluid in the mixing zone was approximately 400° C. After passing the mixing zone the fluid passed through two heaters where the temperature was raised to 420-450 C prior to passing into three 30 litre reactor tubes arranged in series. The reactors were maintained at 405-415° C. During the residence in the reactors the PE was depolymerized to a synthetic crude oil. The product fluid was cooled to about 150° C. and then depressurized to atmospheric pressure into a product tank. The product tank was fitted with a reflux condenser, non-condensable gas and vapour passing the condenser was analysed by off-line GC analysis from a grab sample.

Example Eleven

End-of-life plastic feedstock was processed according to the method described in Example 1. The composition of the feedstock and of the naphtha boiling range fractions of the resulting syncrude product are summarized in Table 15 below.

TABLE 15

Composition of Naphtha boiling range of syncrude for various feedstock.

| Feedstock | Naphtha Composition IBP-210° C. AEPB |
|---|---|
| Post-consumer rigid plastics containing PE, PP (major components) PET, polyamide, ABS, polycarbonate, PS, EPDM, PVC, polyurethane, PMMA (minor components) AND post-consumer film plastics containing same components, in proportion 2:1 rigid: film by mass | n-Paraffins 14%, Iso-paraffins 9.3%, Olefins including cyclo-olefins 25%, naphthenes 25.5%, aromatics 26.5%, by mass |
| Post-consumer rigid plastics containing PE, PP (major components) PET, polyamide, ABS, polycarbonate, PS, EPDM, PVC, polyurethane, PMMA (minor components) | n-Paraffins 17.4%, olefins including cyclo-olefins 12.3% naphthenes 15.7%, aromatics 26.3%, polars and others 28.3%, by volume |
| Waste industrial plastics PE (80%) and PET (20%), pellets | n-Paraffins 34.7%, Isoparaffins 11.6%, Olefins 4.9%, Naphthenes 13.2%, Aromatics 15.8%, polars and others 19.9%, by mass |
| Waste industrial plastics nominally PE | n-Paraffins 33.27%, Isoparaffins 11.5%, Olefins 2.8%, Naphthenes 10.5%, Aromatics 14.4%, polars and others 27.5%, by mass |

The invention claimed is:

1. A method for treating polymeric material to produce hydrocarbon products, the method comprising:
generating a reaction mixture comprising a synthetic polymeric material and an aqueous solvent;
treating the reaction mixture in a reactor apparatus at a reaction temperature and a reaction pressure over a period of time suitable for conversion of all or a portion of the synthetic polymeric material present in the reaction mixture into a liquid product stream, wherein the liquid product stream is at a temperature of at least 350° C. and a pressure of at least 180 bar;
depressurising the liquid product stream in a flash vessel, thereby vaporizing at least a portion of the liquid product stream to generate a vapor comprising constituent parts of hydrocarbon products, steam, and gas; and
injecting steam, superheated steam or supercritical water into the flash vessel to vaporize any remaining portion of the liquid product stream in the flash vessel to generate a vapor comprising constituent parts of hydrocarbon products, steam and gas;
wherein:
the depressurising comprises reducing the pressure of the liquid product stream to less than 25 bar in the flash vessel, and
wherein the vaporizing provides energy to facilitate fractionation of the vapor into the constituent parts; and collecting the fractionated vapor.

2. The method of claim 1, wherein, immediately prior to the depressurizing, the liquid product stream is at:

(i) a temperature of at least 380° C., and/or
(ii) a pressure of at least 200 bar, 220 bar.

3. The method of claim 1, wherein the flash vessel is coupled directly with an accumulation apparatus, is an integral part of the accumulation apparatus, or is directly coupled to one or more staged product condensers.

4. The method of claim 1, comprising fractionating and condensing the vapor into fractions having a maximum atmospheric equivalent boiling point of less than 600° C. and collecting a residual fraction with a minimum atmospheric equivalent boiling point of more than 400° C.

5. The method of claim 1, wherein solid fillers and/or inorganic matter, and/or metal salts from the depressurized product stream are retained within a residue matrix produced by said vaporizing and fractionation.

6. The method of claim 1, wherein the depressurising and fractionation enables separation of the aqueous solvent from the hydrocarbon products including separation of the aqueous solvent from:

(i) low boiling hydrocarbons at a temperature below 60° C.; or
(ii) low boiling hydrocarbons at a temperature below 60° C., conducted under an effective gravity of 9.8+/−0.1 m/s$^2$.

7. The method of claim 1, wherein said generating of the reaction mixture comprises:
providing a molten stream of the synthetic polymeric material;
injecting the aqueous solvent into the molten stream of synthetic polymeric material, wherein the aqueous solvent is supercritical prior to said injecting; and
mechanical mixing of the aqueous solvent and the molten stream of synthetic polymeric material, wherein the mechanical mixing comprises use of solvent distribution grids in an assembly comprising one or more static mechanical mixing devices.

8. The method of claim 7, wherein the aqueous solvent is water or substantially water.

9. The method of claim 7, wherein the aqueous solvent is supercritical prior to said injecting.

10. The method of claim 1, wherein said treating comprises contacting the reaction mixture with supplementary metal catalysts in addition to those present in any metal surface in contact with the reaction mixture during said generating or treating, wherein the supplementary metal catalysts are components of a solid material that is mixed into the reaction mixture to facilitate contact between the fluids and the supplementary metal catalyst, and/or a component of any said mixing device.

11. The method of claim 10, wherein the supplementary metal catalysts are solid state transition metal catalysts.

12. The method of claim 10, wherein the supplementary metal catalysts are solid state transition metal catalysts, and wherein the oxidation state of the transition metal is initially a formal zero valent oxidation state.

13. The method of claim 12, wherein the zero valent metal is selected from any of: zero valent iron and nickel.

14. The method of claim 1, further comprising removal of solid materials from the reaction mixture during said treating, wherein the solid materials:
- are inorganic materials present within the synthetic polymeric material, wherein the inorganic materials;
- are fillers or contaminants present within the synthetic polymeric material prior to conducting the method; and/or
- have reacted with the aqueous solvent and/or with carbon rich materials formed in small volumes by side reactions during said treating;
- have a greater density than fluids within the reaction mixture and separate from the reaction mixture by gravity during said treating; and
- are removed from a reactor apparatus in which said treating is conducted by blowing down into a receiver vessel during said treating by means of remotely operated valves.

15. The method of claim 1, wherein the method is conducted in a reactor apparatus comprising any one or more of:
- systems for testing pressure levels in valving and a pressure letdown vessel within said reactor apparatus,
- a system allowing cooling of material blown down into a receiver vessel of the reactor apparatus,
- a final collection pot with removable lid for blown down material that is interlocked with its lid and with interconnected pipes and valves to prevent accidental removal of the pot and contents,
- venting for release of gases formed during or after said treating,
- providing inert atmospheres comprising nitrogen, argon, carbon dioxide and/or other inert gases preventing ignition and combustion of materials contained within the letdown pot and collection pot, and
- sequencing systems to minimize mechanical shock in the reactor apparatus.

16. The method of claim 1, wherein the reaction temperature is at least 380° C., 400° C., 450° C., or 500° C.

17. The method of claim 1, wherein the hydrocarbon product comprises any one or more of:
(i) a naphtha component boiling between 10° C. and 210° C. atmospheric equivalent boiling point (AEBP), and wherein the naphtha component comprises:
- more than 10% by mass olefins; and/or
- more than 10% by mass n-paraffins; and/or
- more than 10% by mass cycloalkanes or cycloalkenes; and/or
- more than 10% by mass aromatics;

(ii) a gas oil component boiling between 210° C. and 360° C. atmospheric equivalent boiling point (AEBP), and wherein the gas oil component comprises:
- more than 10% by mass olefins; and/or
- more than 10% by mass n-paraffins; and/or
- more than 10% by mass cycloalkanes or cycloalkenes; and/or
- more than 10% by mass aromatics;

(iii) a heavy gas oil component boiling between 360° C. and 550° C. atmospheric equivalent boiling point (AEBP), and the heavy gas oil component comprises:
- more than 10% by mass olefins; and/or
- more than 10% by mass n-paraffins; and/or
- more than 10% by mass cycloalkanes or cycloalkenes; and/or
- more than 10% by mass aromatics.

18. The method of claim 1, wherein:
- the synthetic polymeric material used to generate said reaction mixture is a molten polymeric material extrudate;
- the synthetic polymeric material extrudate is diverted to a collection vessel prior to generating said reaction mixture;
- the collection vessel is provided with an inert atmosphere avoiding combustion of the molten polymeric material extrudate; and
- the collection vessel is connected to a reactor apparatus by one or more lines providing double valve isolation on each line to prevent reverse flow of the molten polymeric material extrudate from the reactor.

19. The method of claim 1, wherein:
(i) the treating is performed under conditions of continuous flow; and/or
(ii) the polymeric material does not comprise any one or more of: lignocellulosic matter; naturally-occurring carbohydrate polymers; lignin; cellulose; hemicellulose; combinations of any two of lignin, cellulose, hemicellulose; lignite (brown coal); subbituminous coal; any combination thereof.

20. The method of claim 9, wherein the supercritical aqueous solvent is generated in a boiler apparatus comprising a burner fueled by gas released from the liquid product stream, wherein the supercritical aqueous solvent exits the boiler apparatus at:
(i) a temperature of at least 450° C., and/or
(ii) a pressure of at least 180 bar during generation of the supercritical aqueous solvent.

* * * * *